(12) United States Patent
Sethi

(10) Patent No.: US 8,789,351 B2
(45) Date of Patent: Jul. 29, 2014

(54) FLEXIBLE DRAPER AND CUTTER BAR HAVING SHIFTABLE CROP DIVIDER WITH DEFLECTOR

(71) Applicant: AGCO Corporation, Duluth, GA (US)

(72) Inventor: Gagan Sethi, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/898,924

(22) Filed: May 21, 2013

(65) Prior Publication Data

US 2013/0247529 A1 Sep. 26, 2013

Related U.S. Application Data

(60) Continuation of application No. 13/551,179, filed on Jul. 17, 2012, which is a division of application No. 13/044,288, filed on Mar. 9, 2011, now Pat. No. 8,240,116, which is a continuation of application No. 12/118,444, filed on May 9, 2008, now Pat. No. 7,921,627.

(51) Int. Cl.
*A01D 43/00* (2006.01)
(52) U.S. Cl.
USPC .................................. 56/181; 56/296; 56/297

(58) Field of Classification Search
USPC ......... 56/14.5, 15.8, 181, 182, 119, 153, 257, 56/264, 270, 296–299, 314, 123, 158, 17.6
See application file for complete search history.

(56) References Cited

U.S. PATENT DOCUMENTS

| | | | | |
|---|---|---|---|---|
| 2,251,637 | A * | 8/1941 | Ronning | 56/12.3 |
| 2,667,728 | A * | 2/1954 | Dray | 56/181 |
| 4,203,333 | A * | 5/1980 | Campari | 81/9.44 |
| 4,380,889 | A * | 4/1983 | Isbell | 56/296 |
| 4,519,190 | A * | 5/1985 | Blakeslee | 56/181 |
| 2006/0042217 | A1* | 3/2006 | Buermann | 56/257 |
| 2007/0193243 | A1* | 8/2007 | Schmidt et al. | 56/181 |

\* cited by examiner

*Primary Examiner* — Alicia Torres
(74) *Attorney, Agent, or Firm* — Hovey Williams LLP

(57) ABSTRACT

A harvesting machine includes a harvesting header with a header frame, a cutterbar assembly attached to the header frame along the length thereof and configured to cut a crop, and a draper assembly positioned behind the cutterbar assembly and operable to receive severed crop material from the cutterbar assembly. The draper assembly includes a center draper that delivers crop material to a feeder house of the harvesting machine and oppositely spaced side drapers that deliver crop material to the center draper. The harvesting header is operable to flex and thereby follow an uneven terrain.

14 Claims, 29 Drawing Sheets

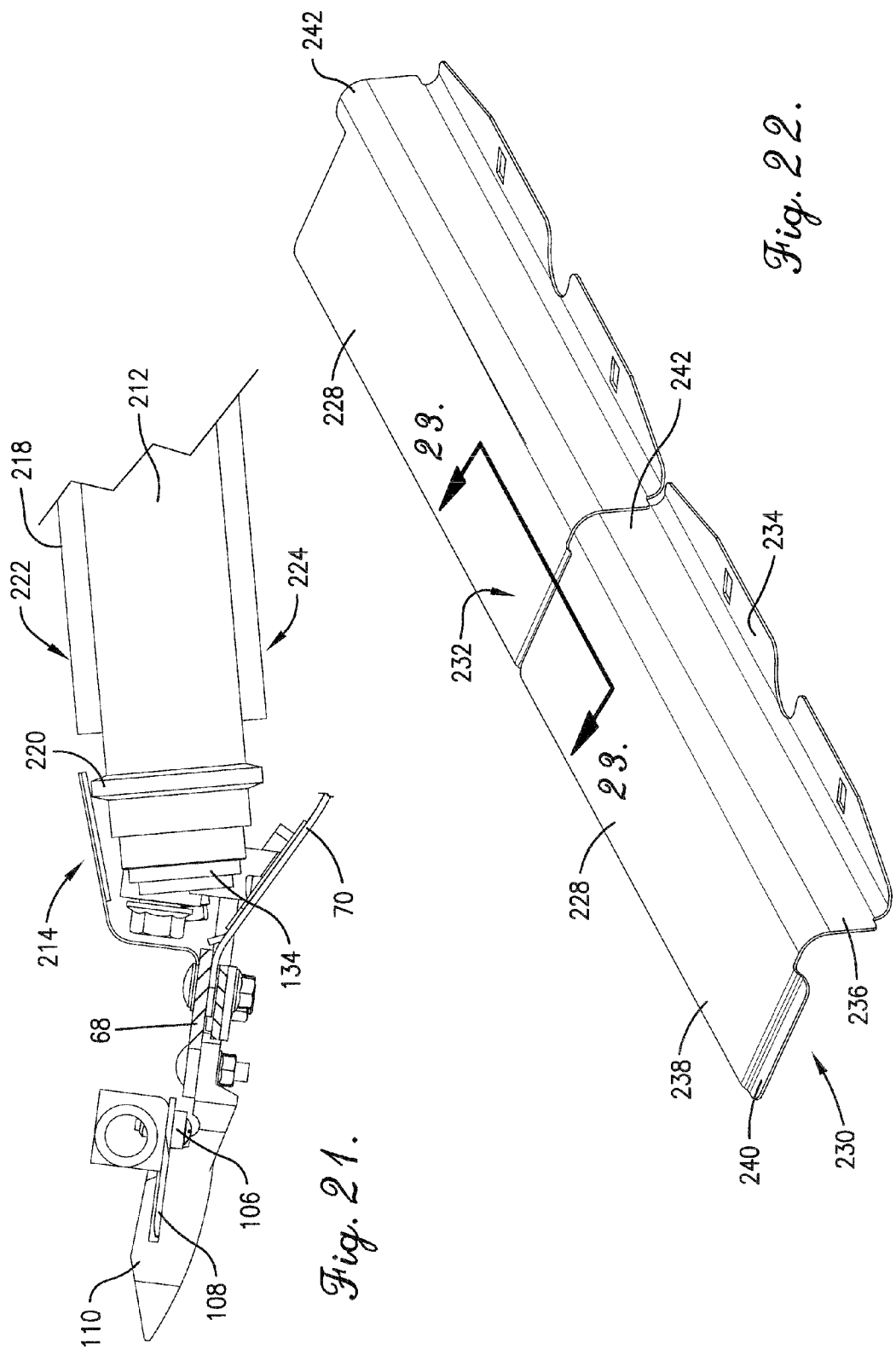

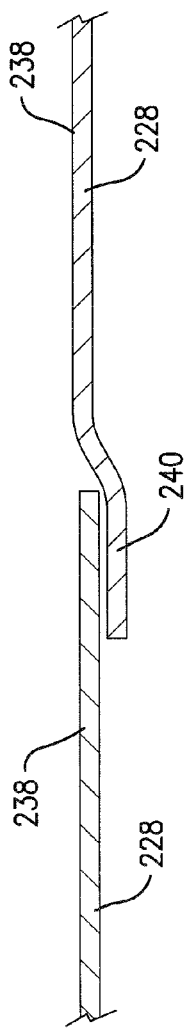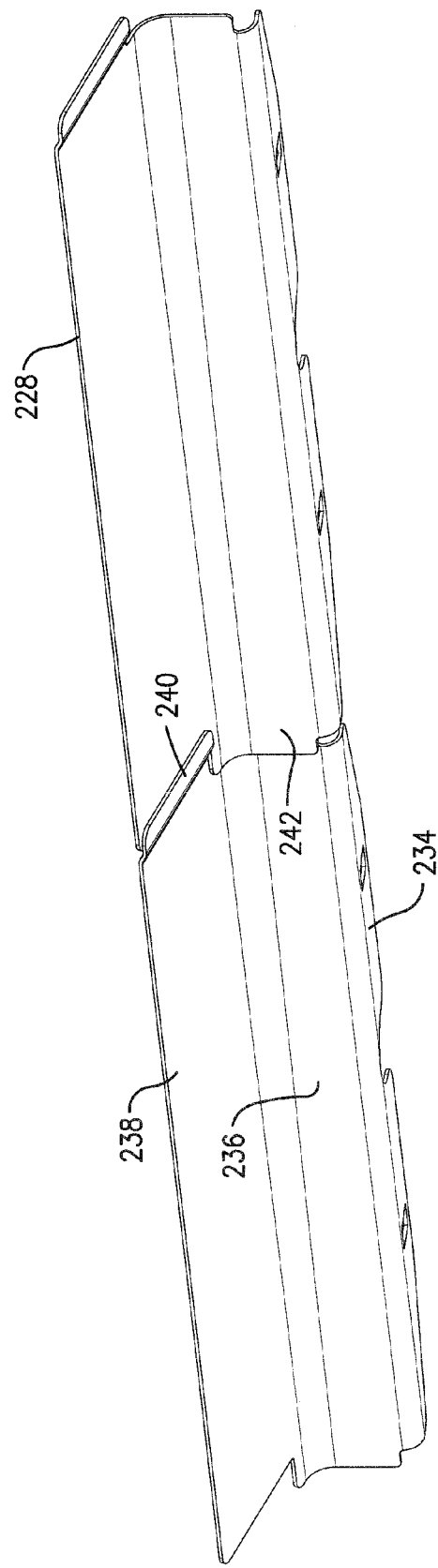

FLEXIBLE DRAPER AND CUTTER BAR HAVING SHIFTABLE CROP DIVIDER WITH DEFLECTOR

RELATED APPLICATION

This is a continuation of U.S. application Ser. No. 13/551,179, filed Jul. 17, 2012, entitled INTERLOCKING BELT GUARDS FOR A DRAPER HEADER, which is a divisional application of U.S. application Ser. No. 13/044,288, filed Mar. 9, 2011, entitled INTERLOCKING BELT GUARDS FOR A DRAPER HEADER, which is a continuation of U.S. application Ser. No. 12/118,444, filed May 9, 2008, entitled INTERLOCKING BELT GUARDS FOR A DRAPER HEADER, each of which is hereby incorporated in their entirety by reference herein.

BACKGROUND

1. Field

The present invention relates generally to a harvesting header. More specifically, embodiments of the present invention concern a harvesting header with a flexible cutterbar and flexible draper conveyor.

2. Discussion of Prior Art

A traditional grain harvesting implement or machine, such as a self-propelled combine, is used to harvest a variety of grains, such as wheat, soybeans, and rice. Combines typically include a harvesting header that cuts the crop and gathers the crop material into a feeder house for threshing and other operations. For some grains, such as wheat, the sickle of the header can be spaced from the ground during the cutting operation. For other grains, the sickle must be positioned close to the ground, often with the header in sliding contact with the ground, in order to collect most of the grain. Flexible headers are used to follow the natural contours of the field while cutting the grain.

Conventional grain harvesters are problematic and suffer from various undesirable limitations. For instance, flexible headers that include a flexible cutterbar are ineffective at receiving all of the severed crop material when following the ground contour at a high speed. Prior art flexible headers are also deficient because they fail to convey all of the received cut crop material to the feeder house. Furthermore, harvesters with flexible headers ineffectively control the header height, particularly when the header is in sliding contact with the ground. Yet further, prior art flexible headers become damaged when operating in close proximity to the ground, particularly when the terrain has a significant contour.

BRIEF DESCRIPTION OF THE DRAWING FIGURES

Preferred embodiments of the invention are described in detail below with reference to the attached drawing figures, wherein.

Figure 1:
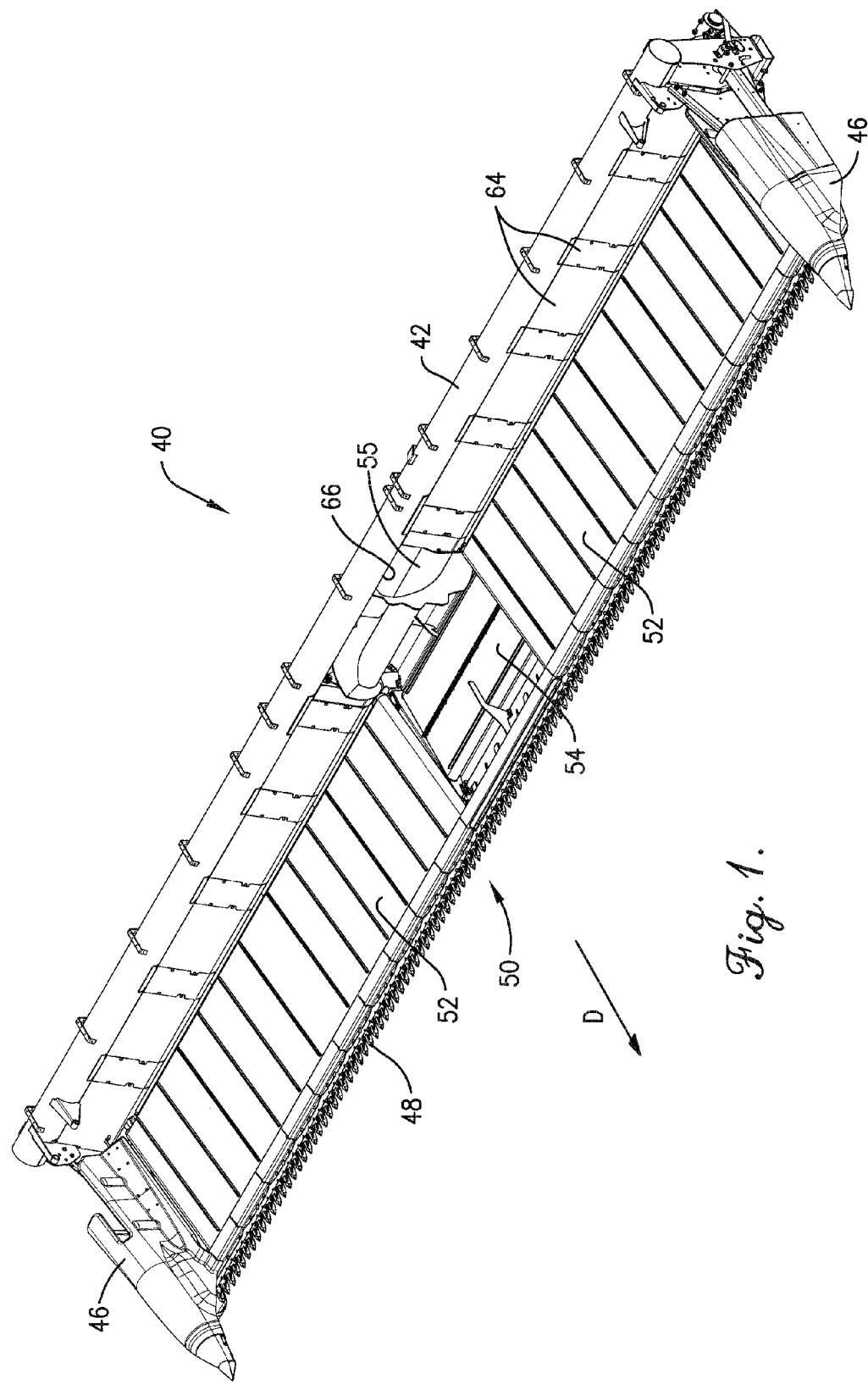
FIG. 1 is a left front perspective view of a harvesting header constructed in accordance with a first preferred embodiment of the present invention.
Figure 2:
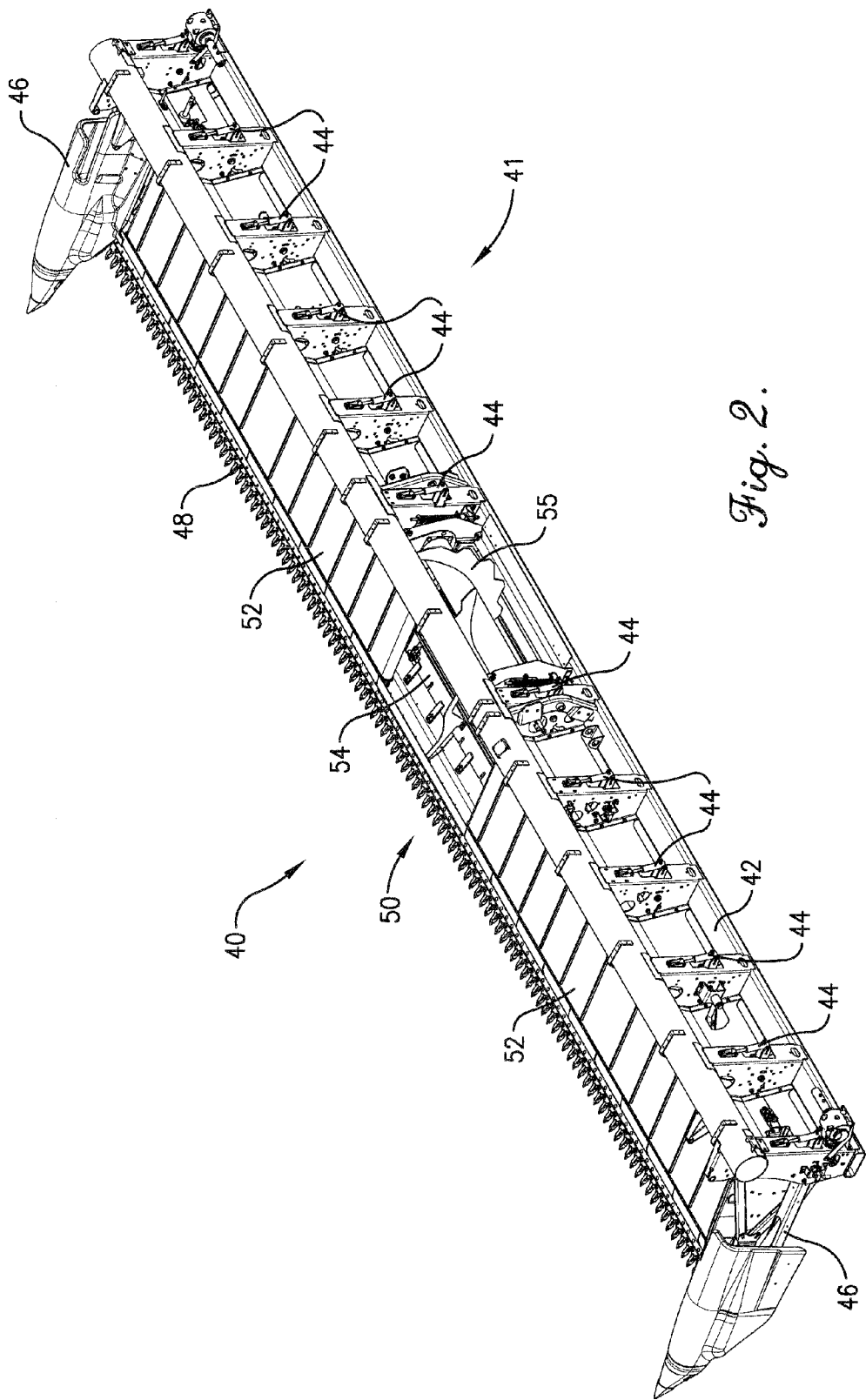
FIG. 2 is a left rear perspective view of the harvesting header shown in FIG. 1.
Figure 3:
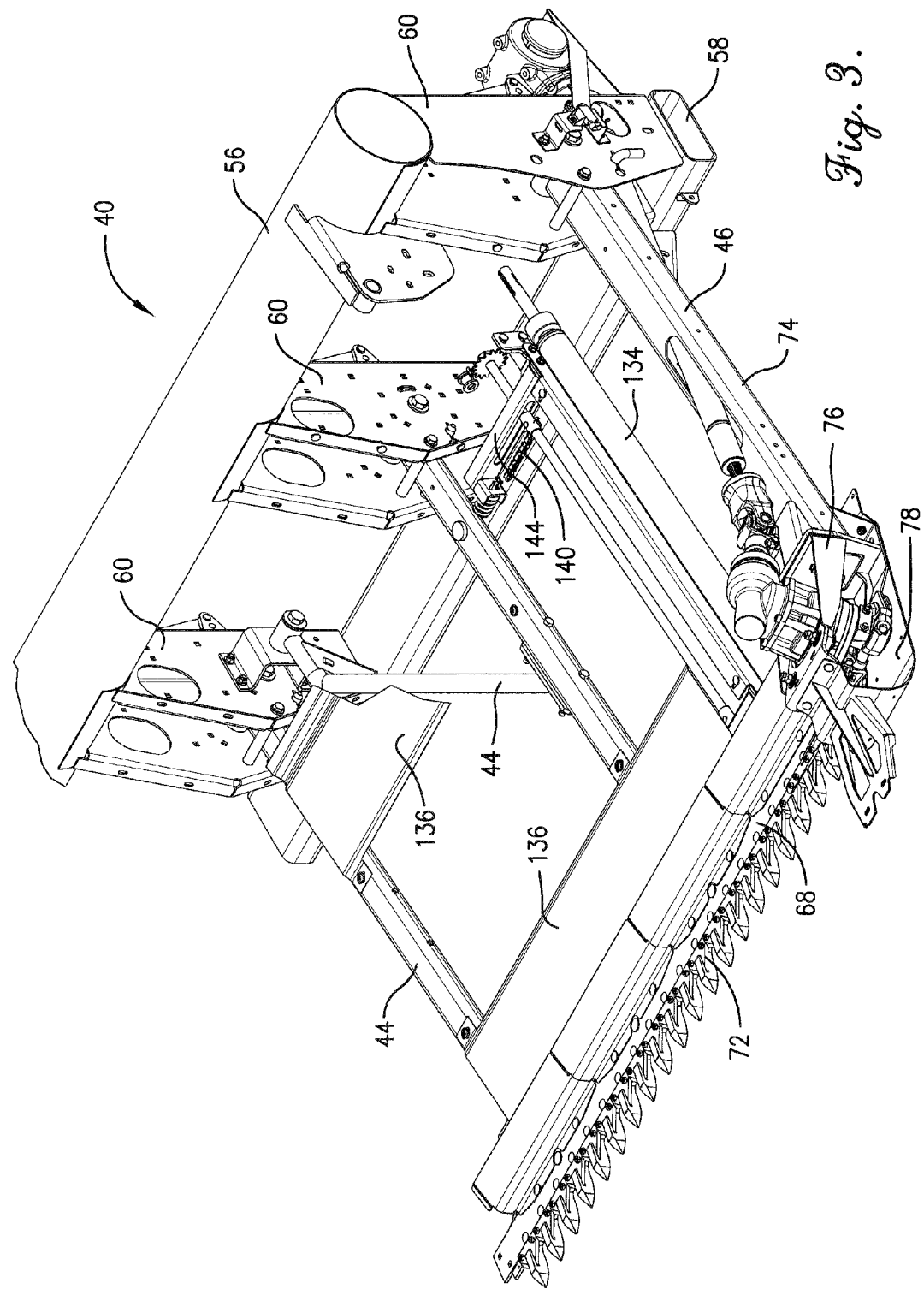
Figure 4:
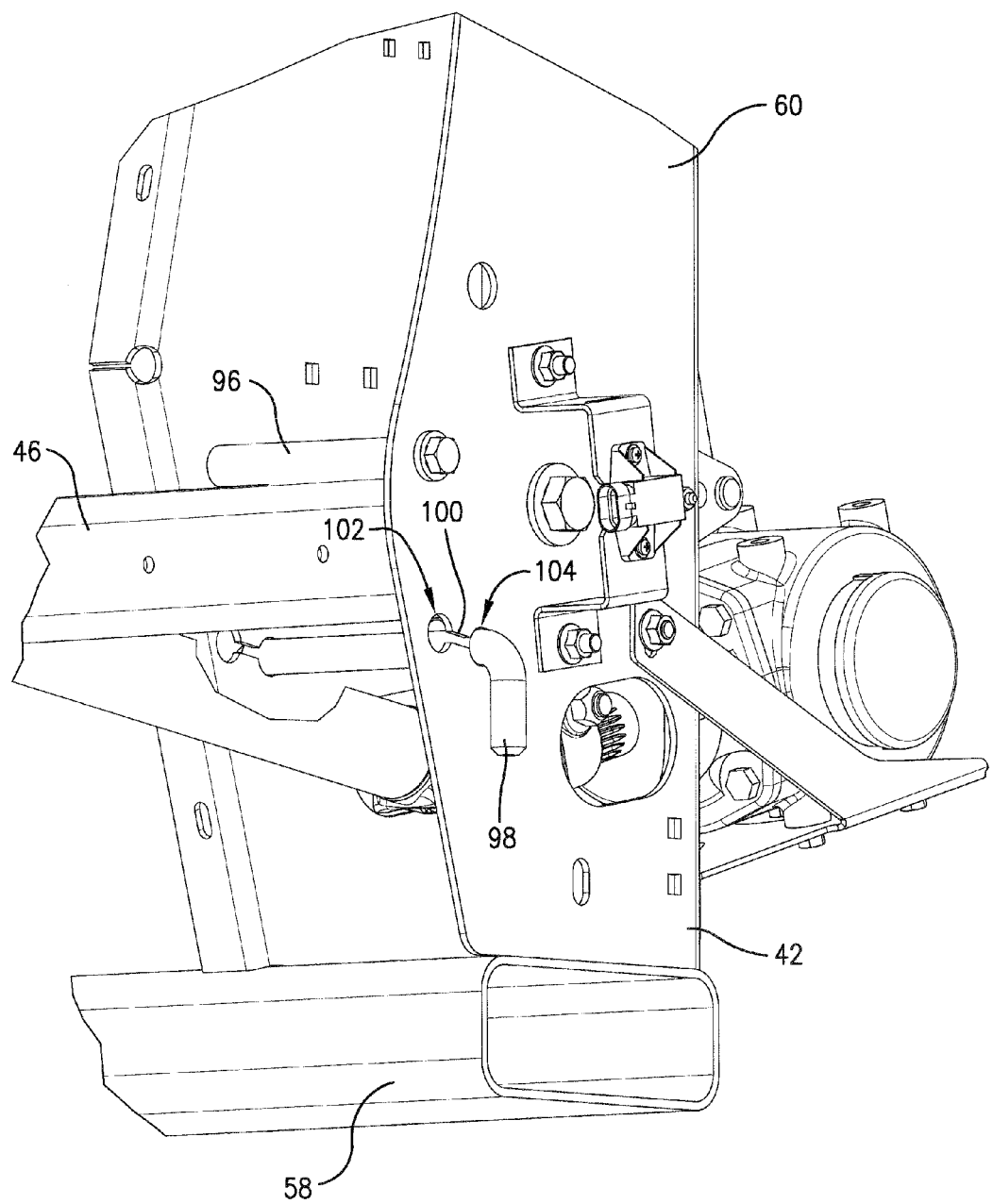
Figure 5:
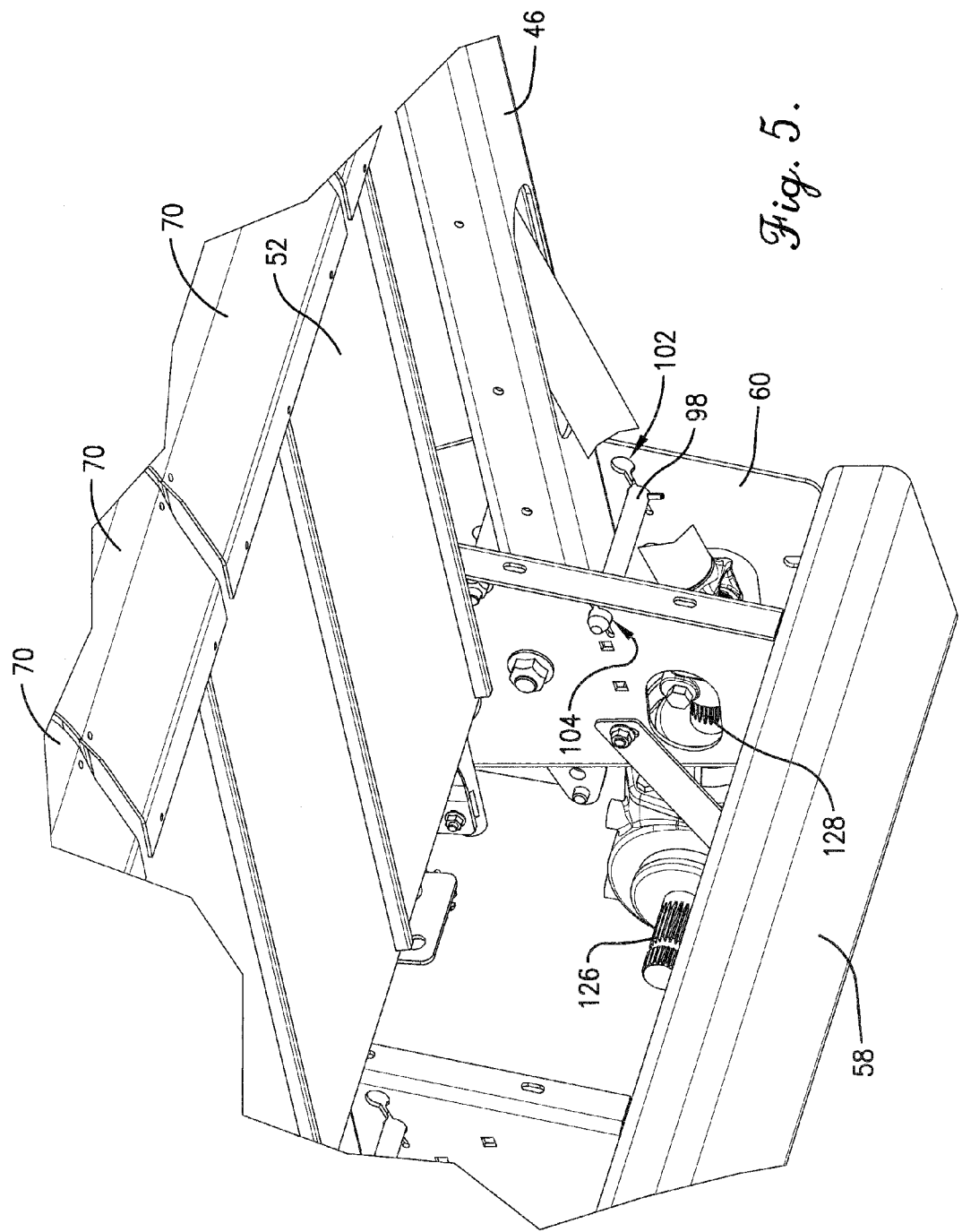
Figure 6:
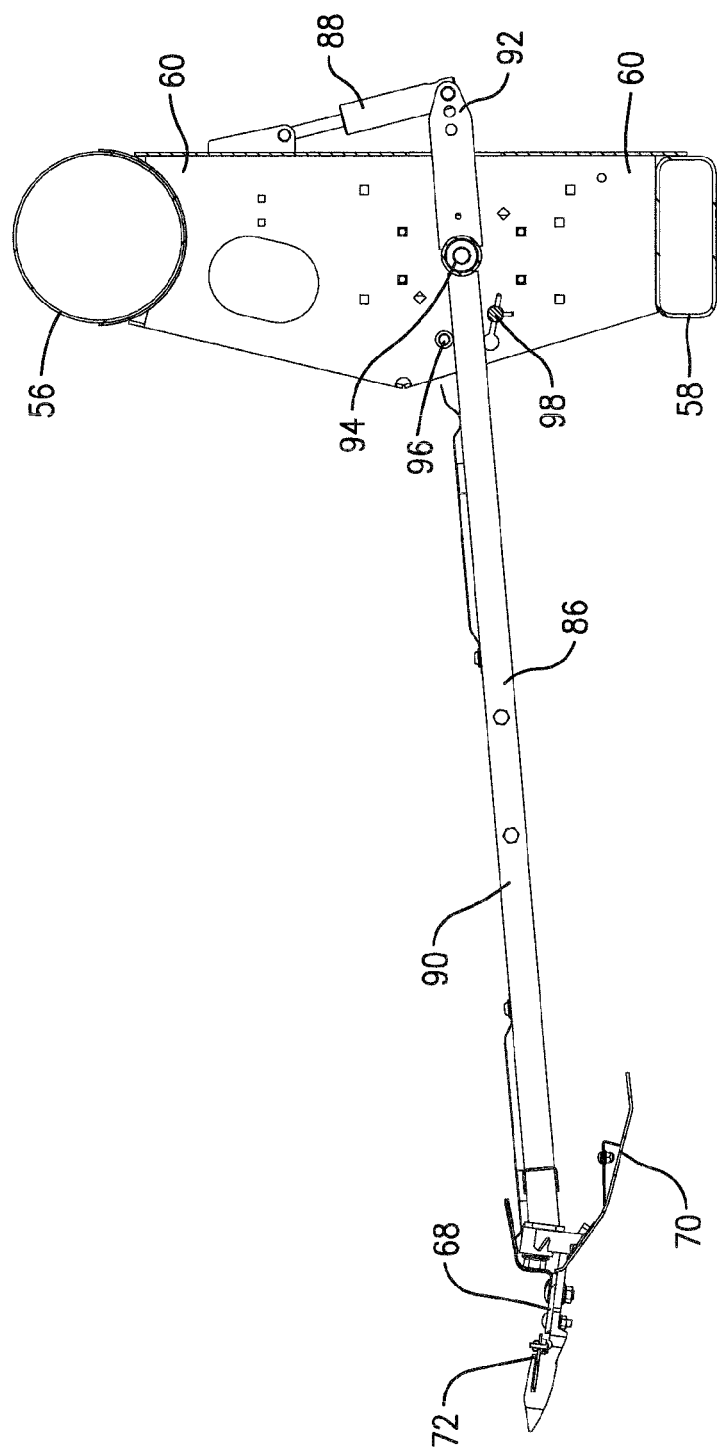
Figure 7:
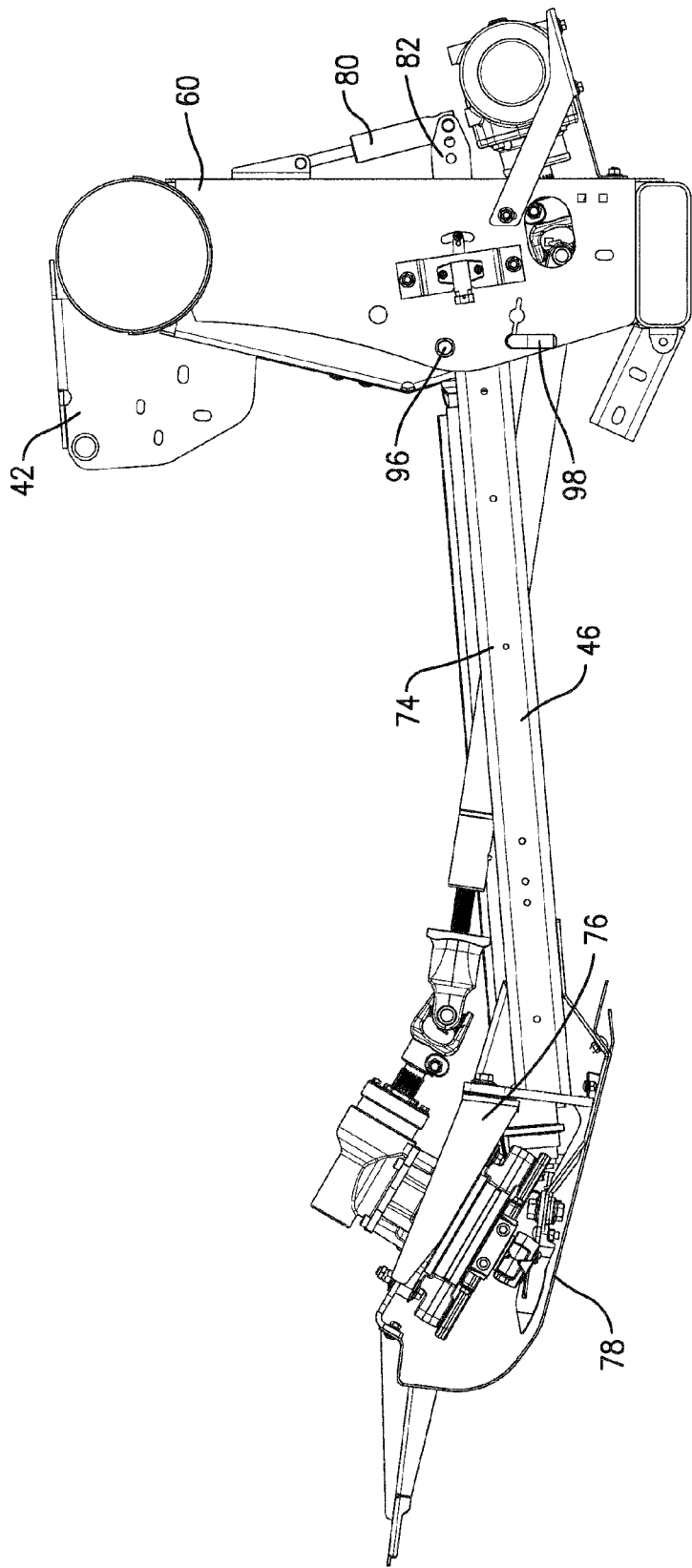
Figure 8:
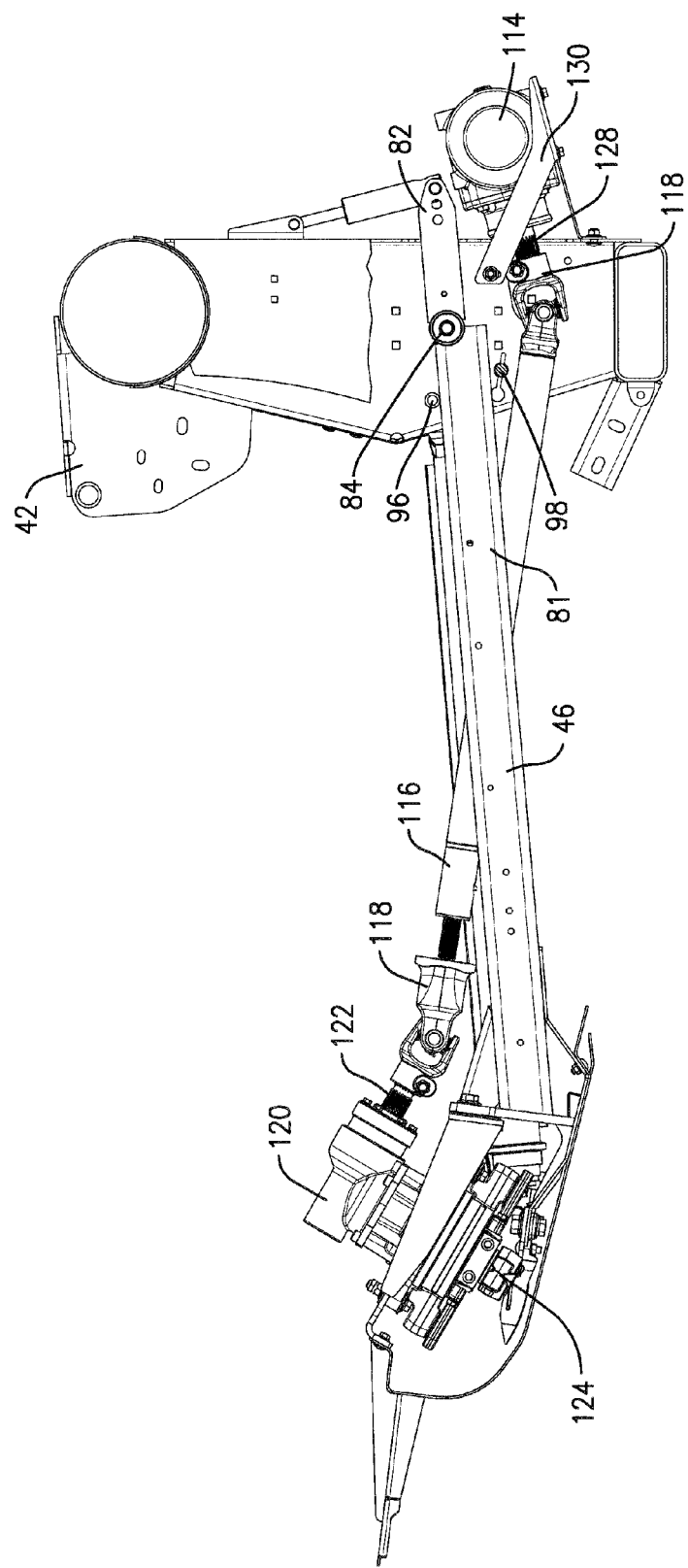
Figure 9:
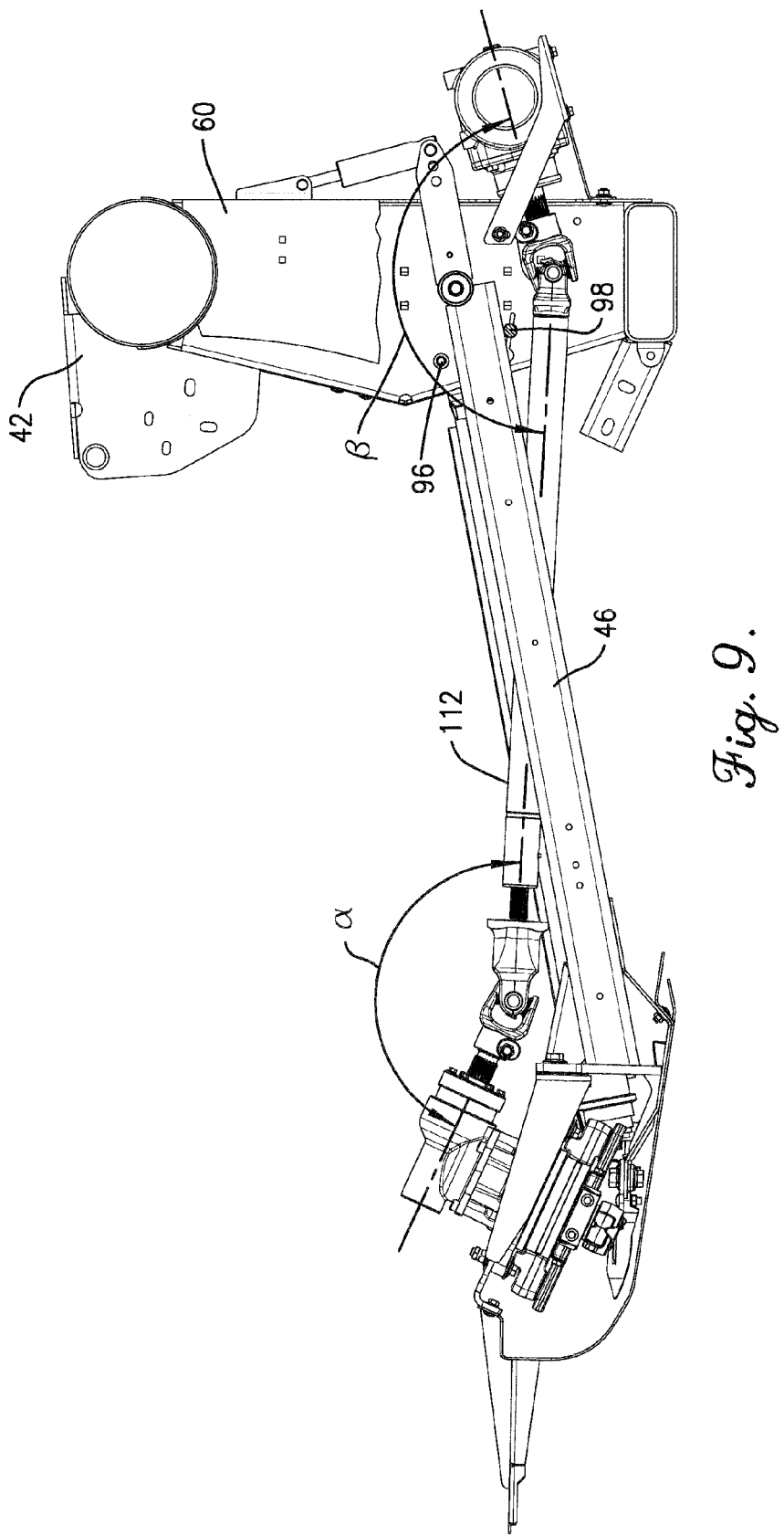
Figure 10:
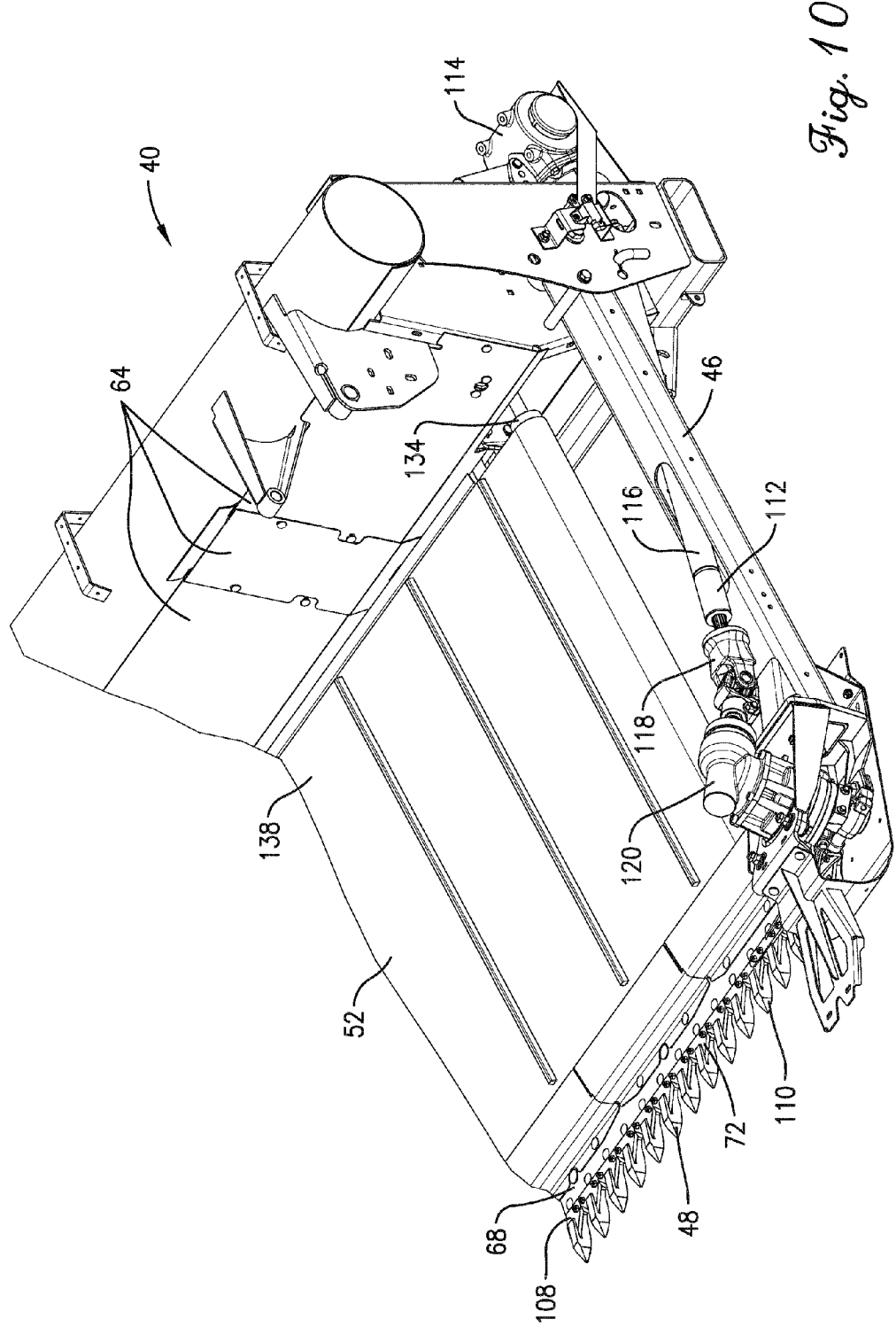
Figure 11:
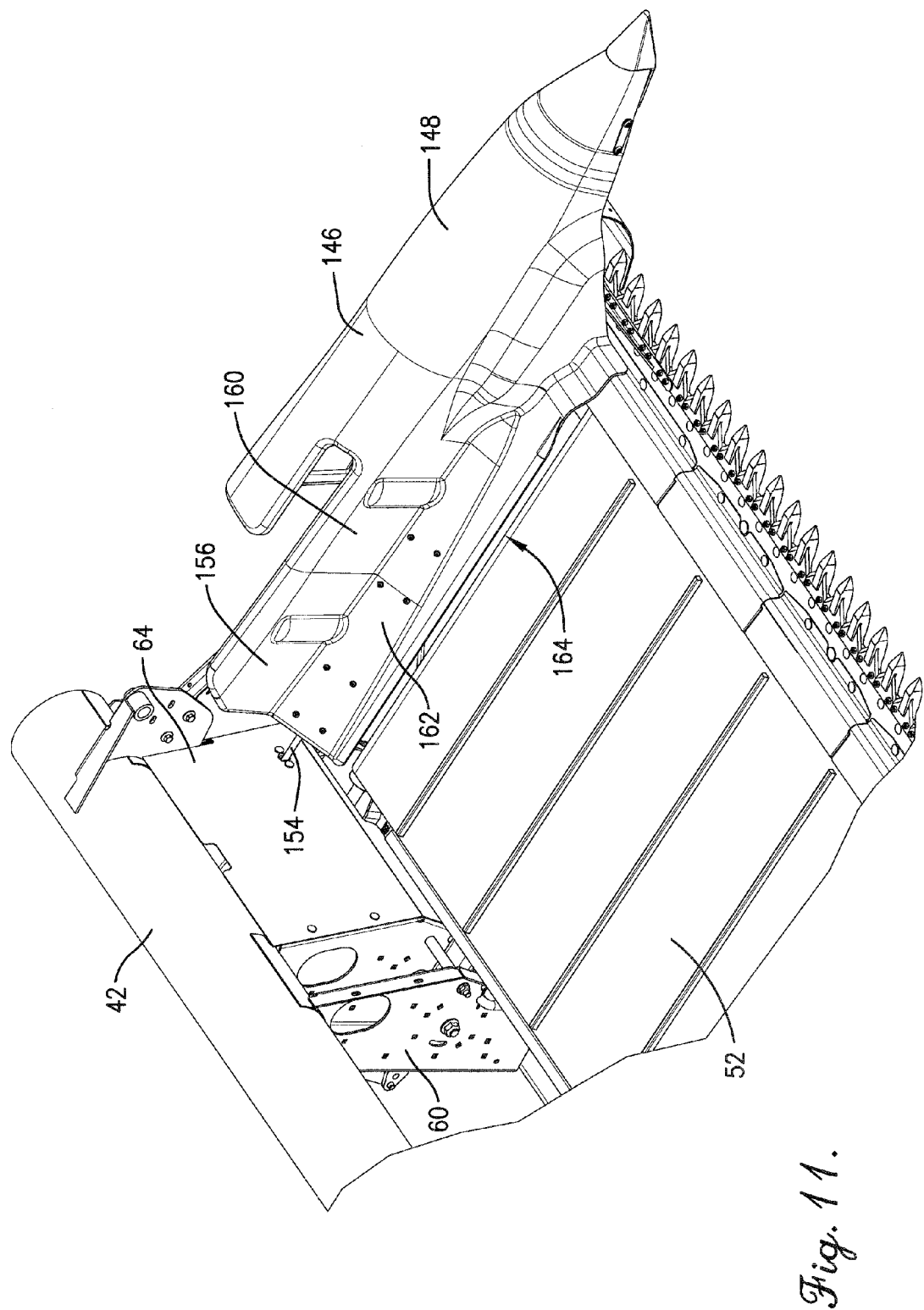
Figure 12:
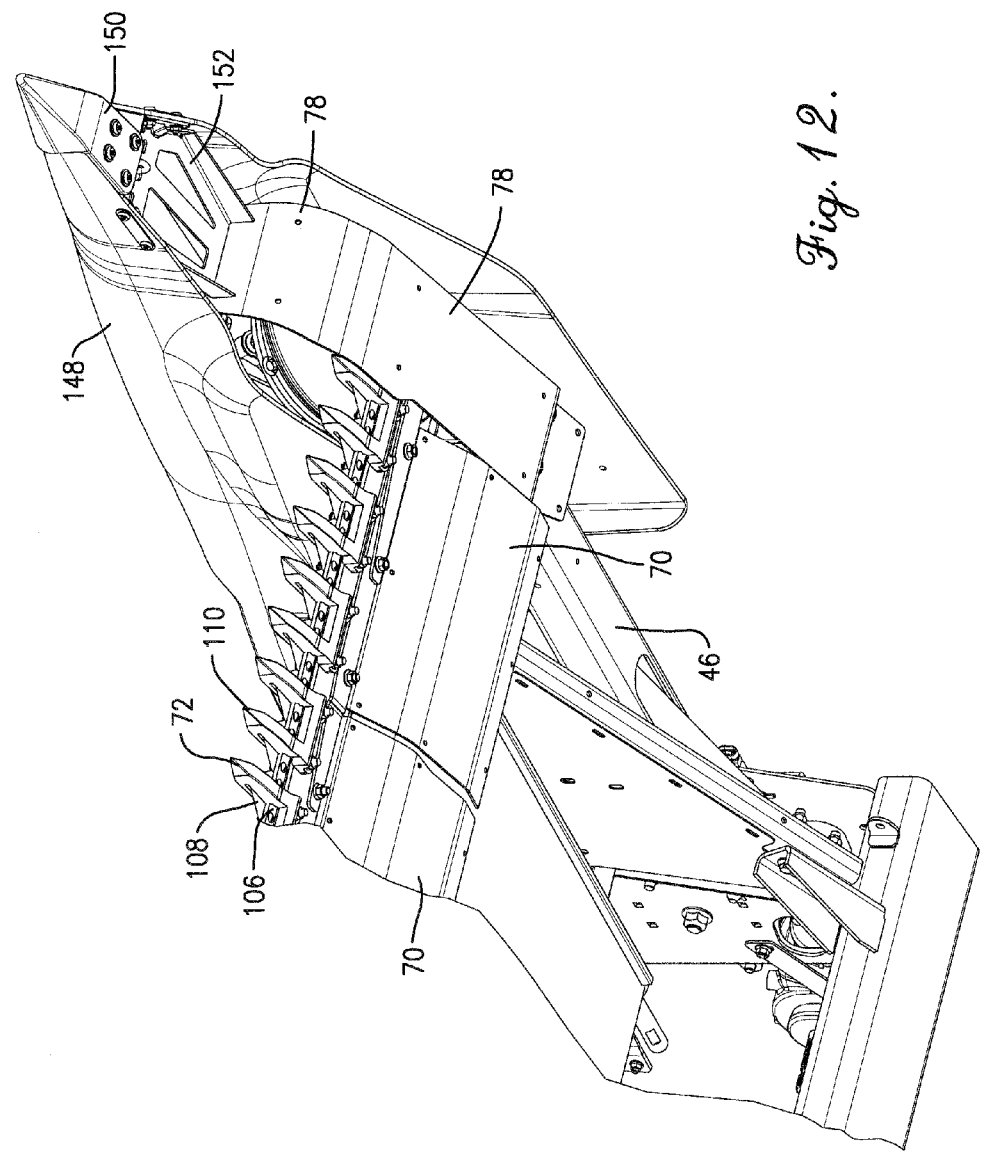
Figure 13:
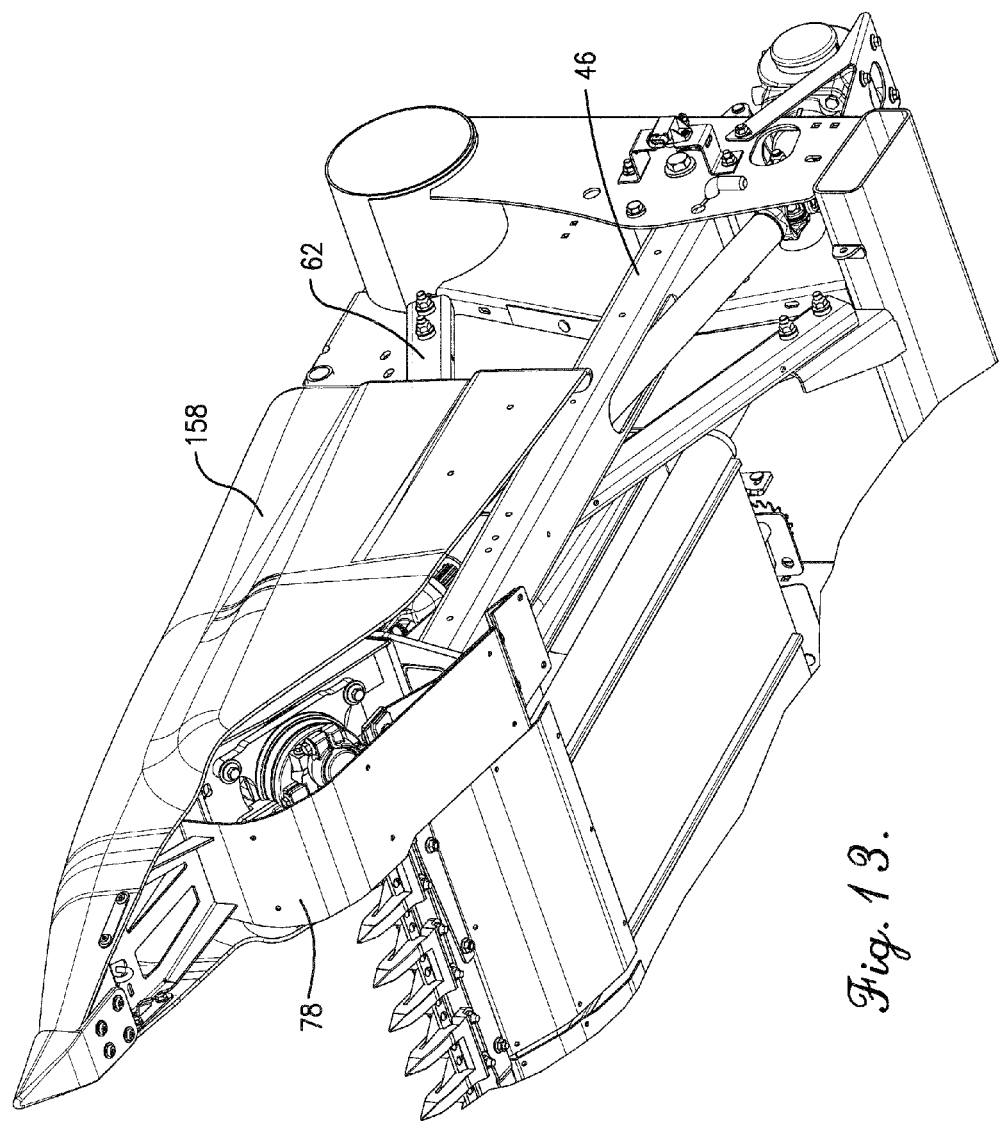
Figure 14:
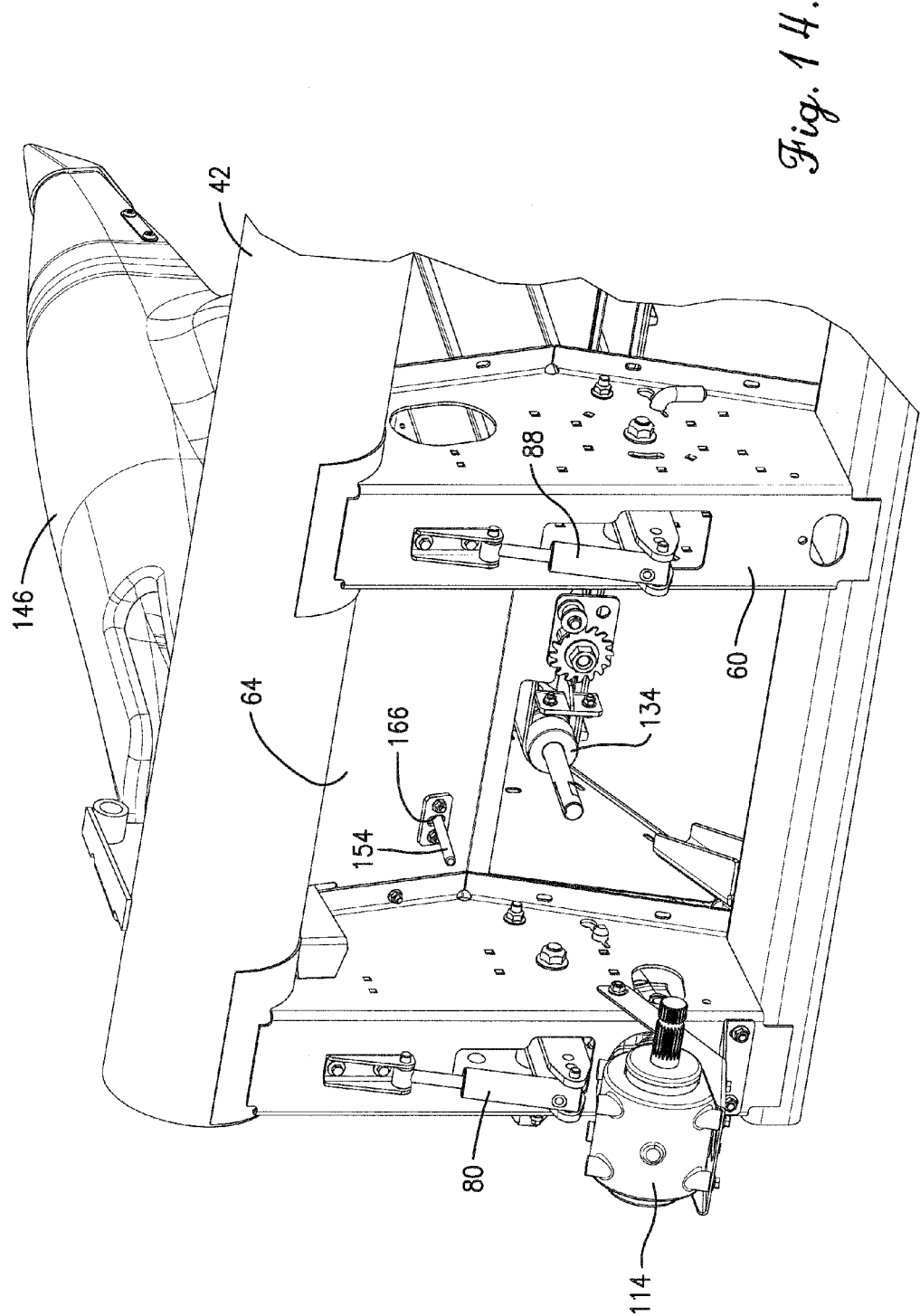
Figure 15:
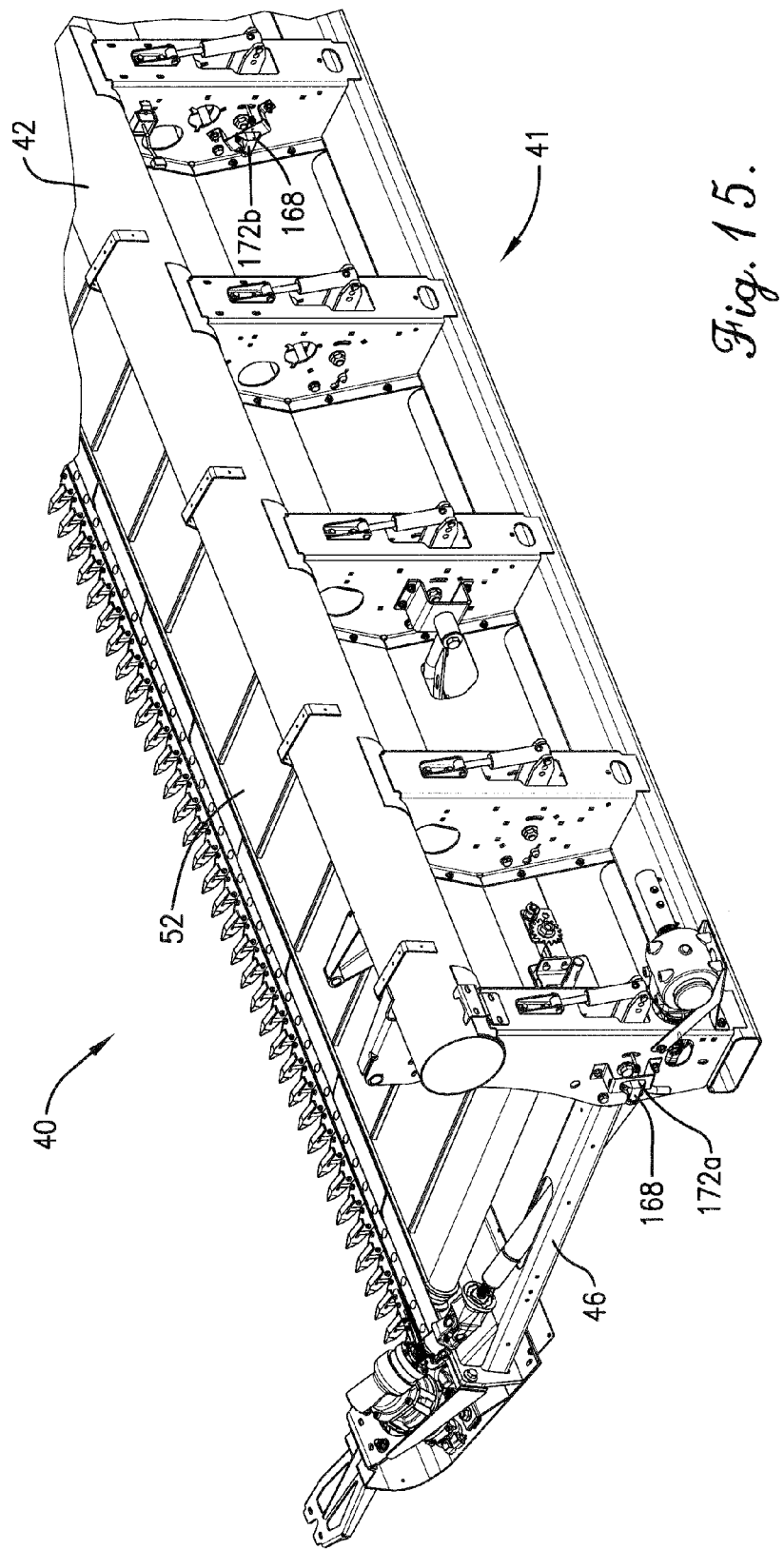
Figure 16:
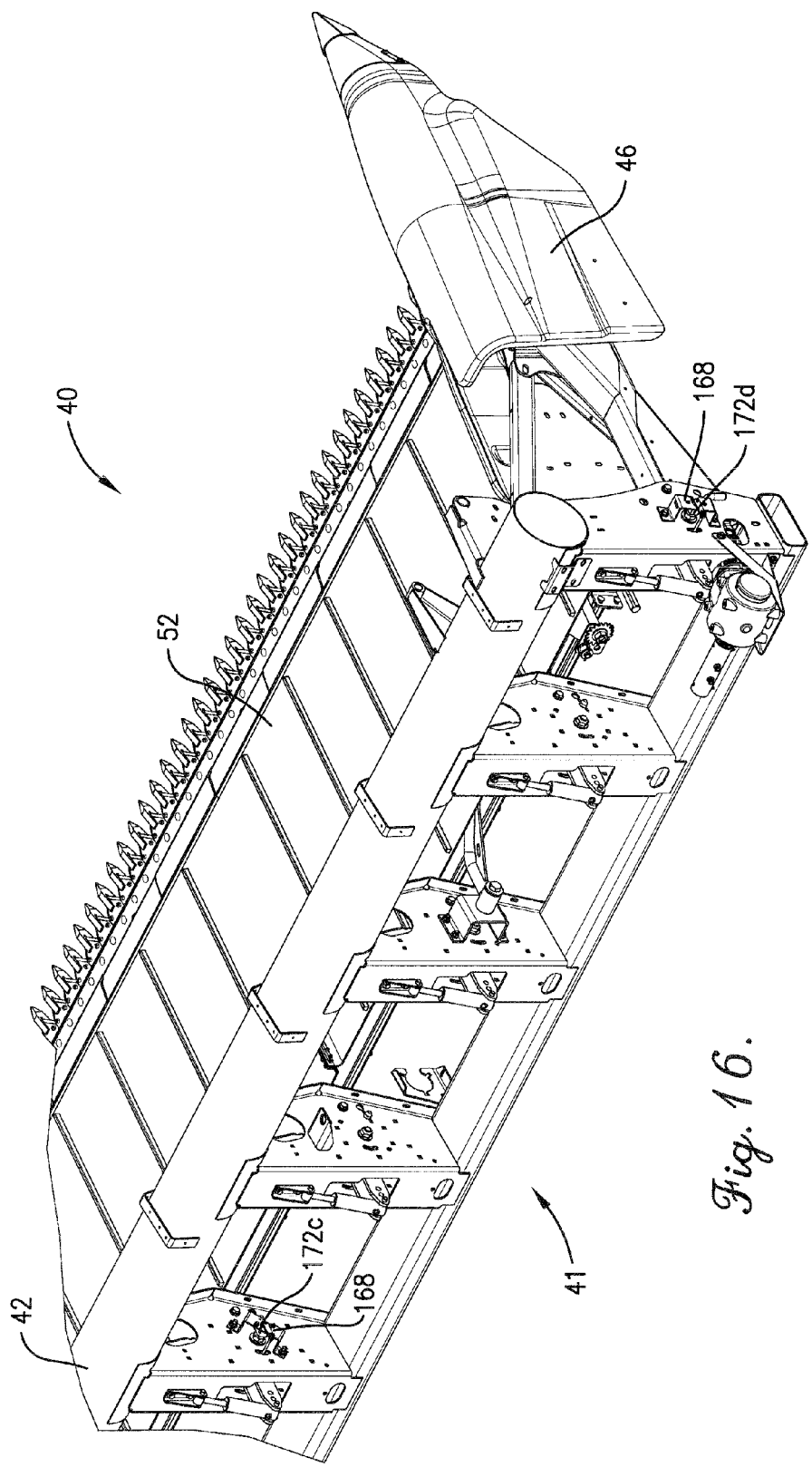
Figure 17:
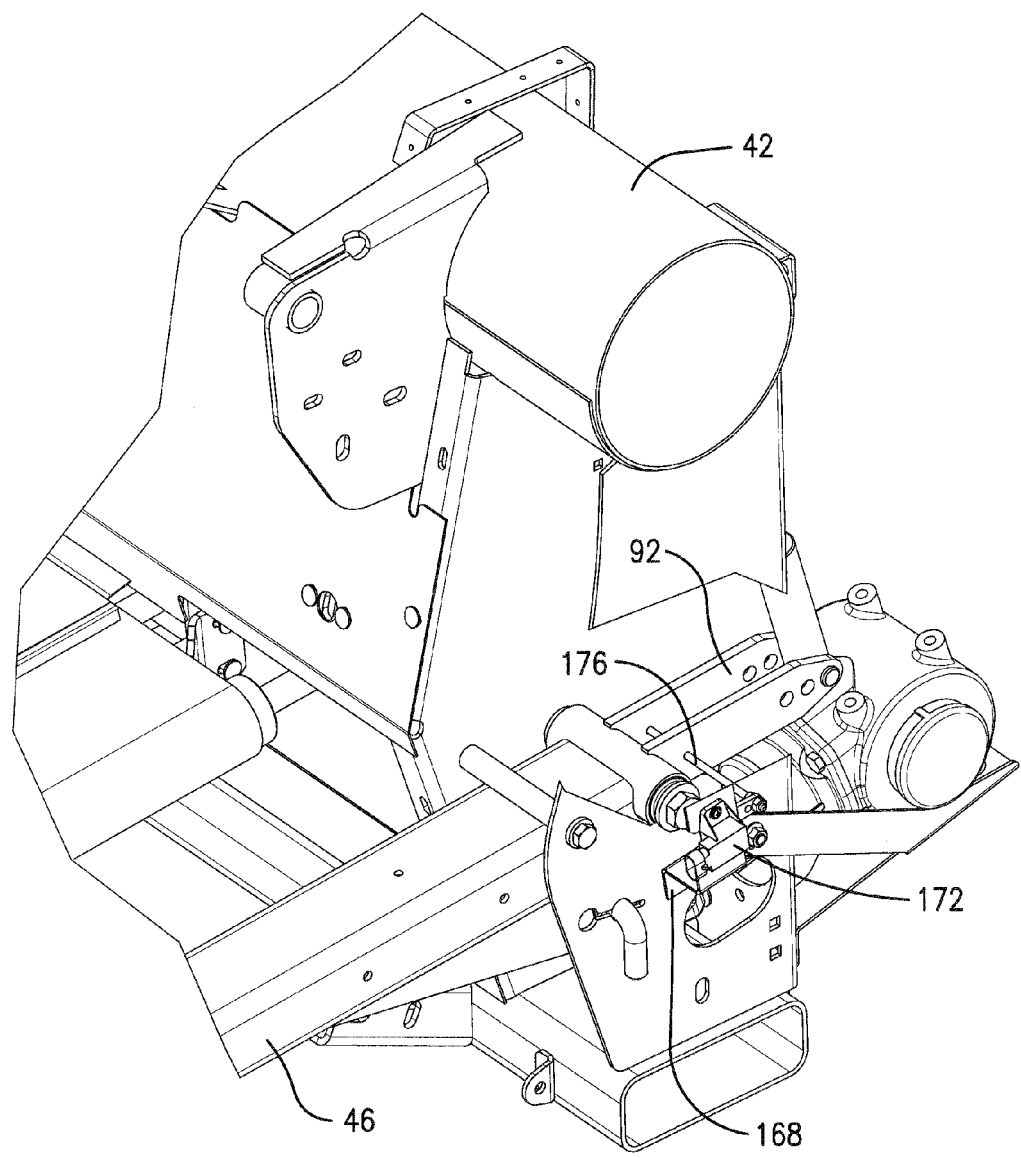
Figure 18:
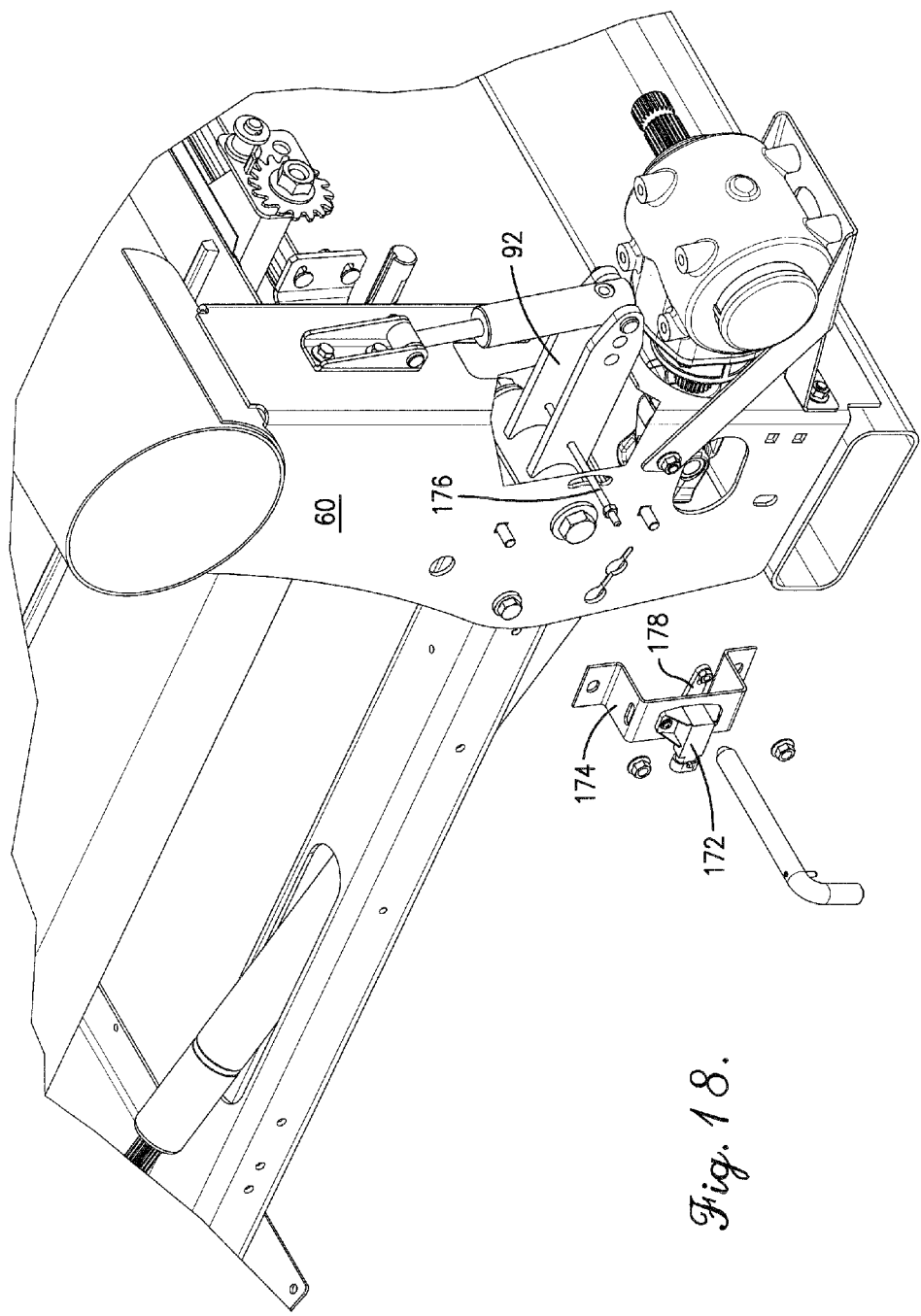
Figure 19:
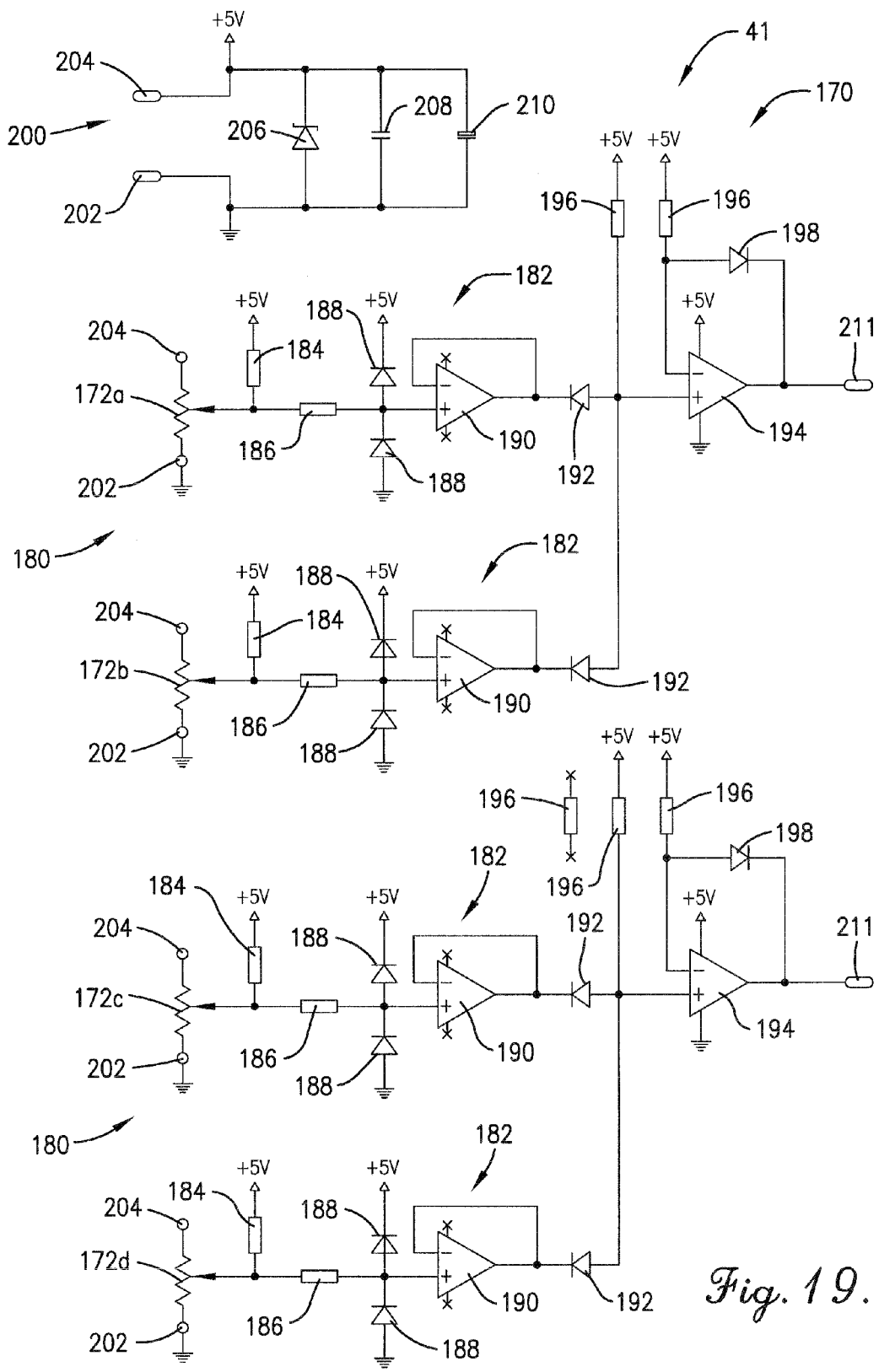
Figure 20:
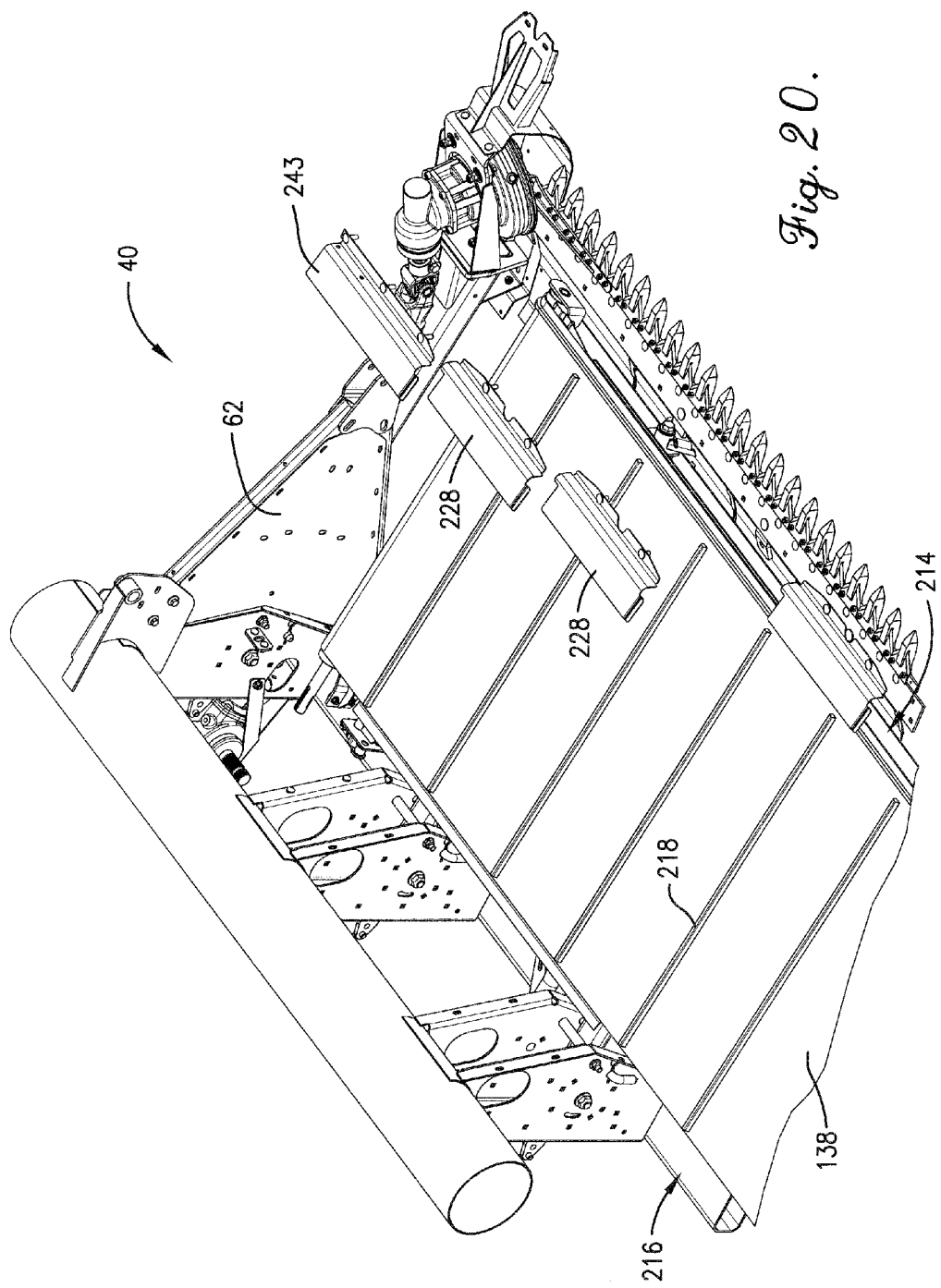
Figure 25:
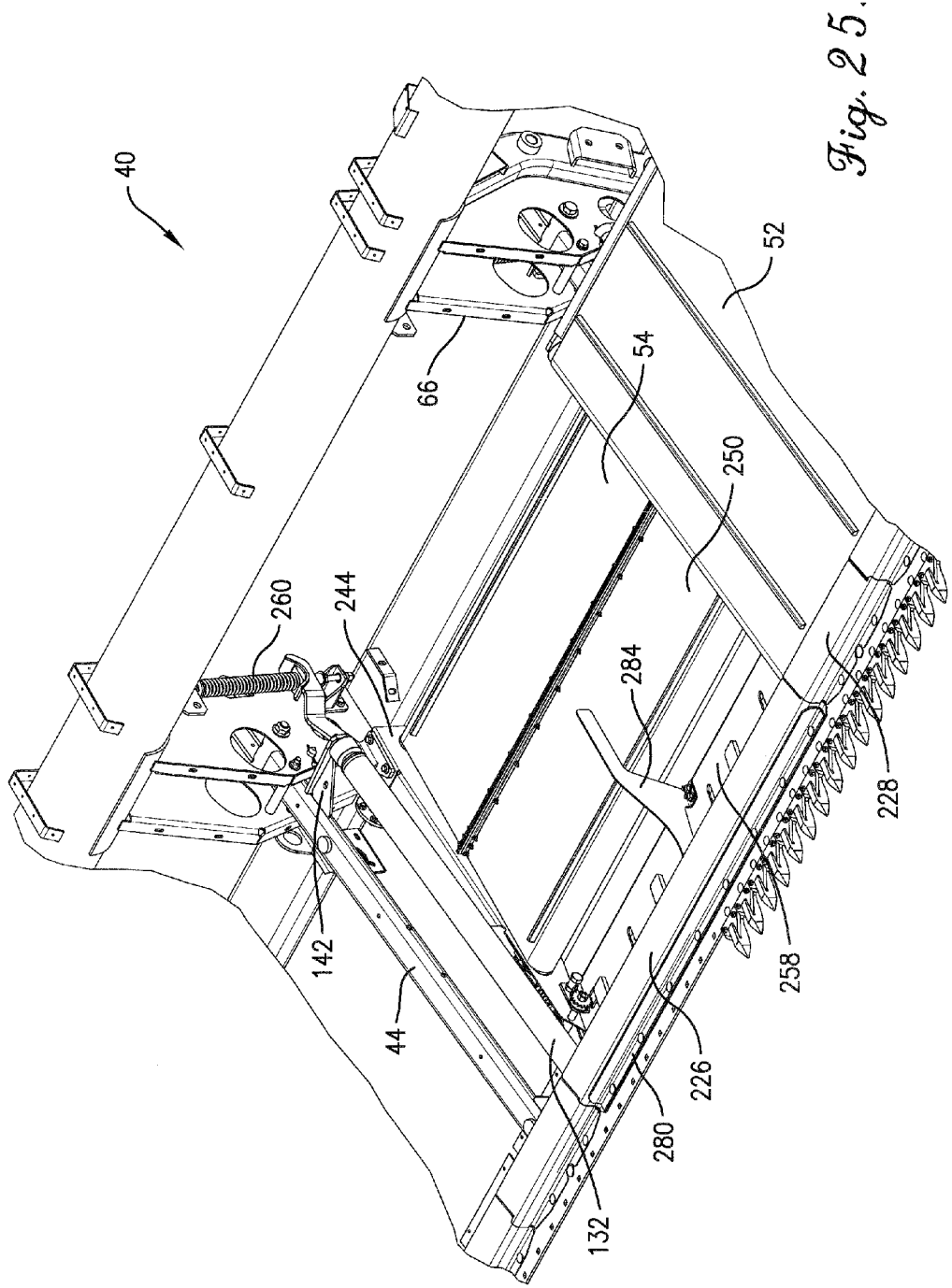
Figure 26:
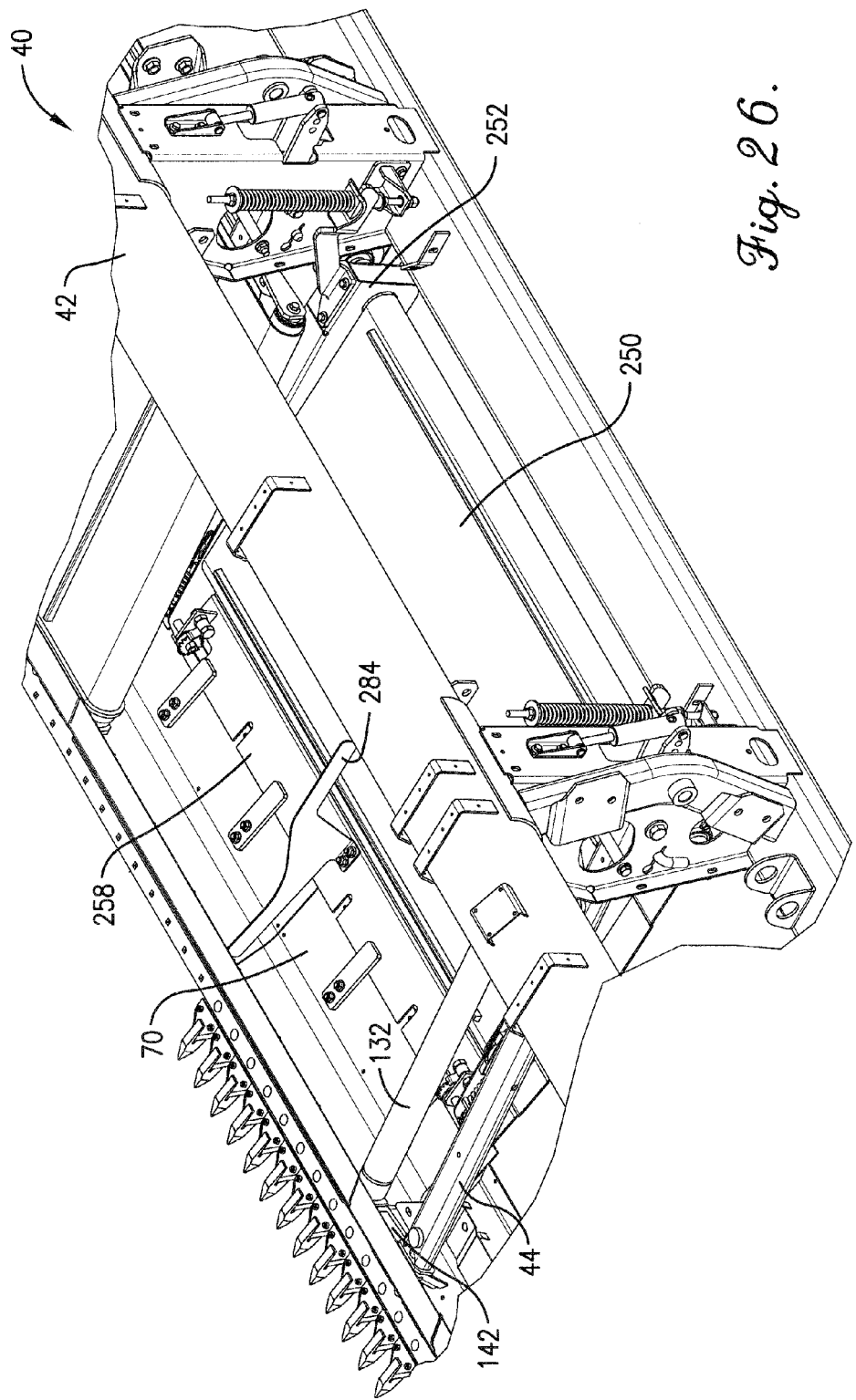
Figure 27:
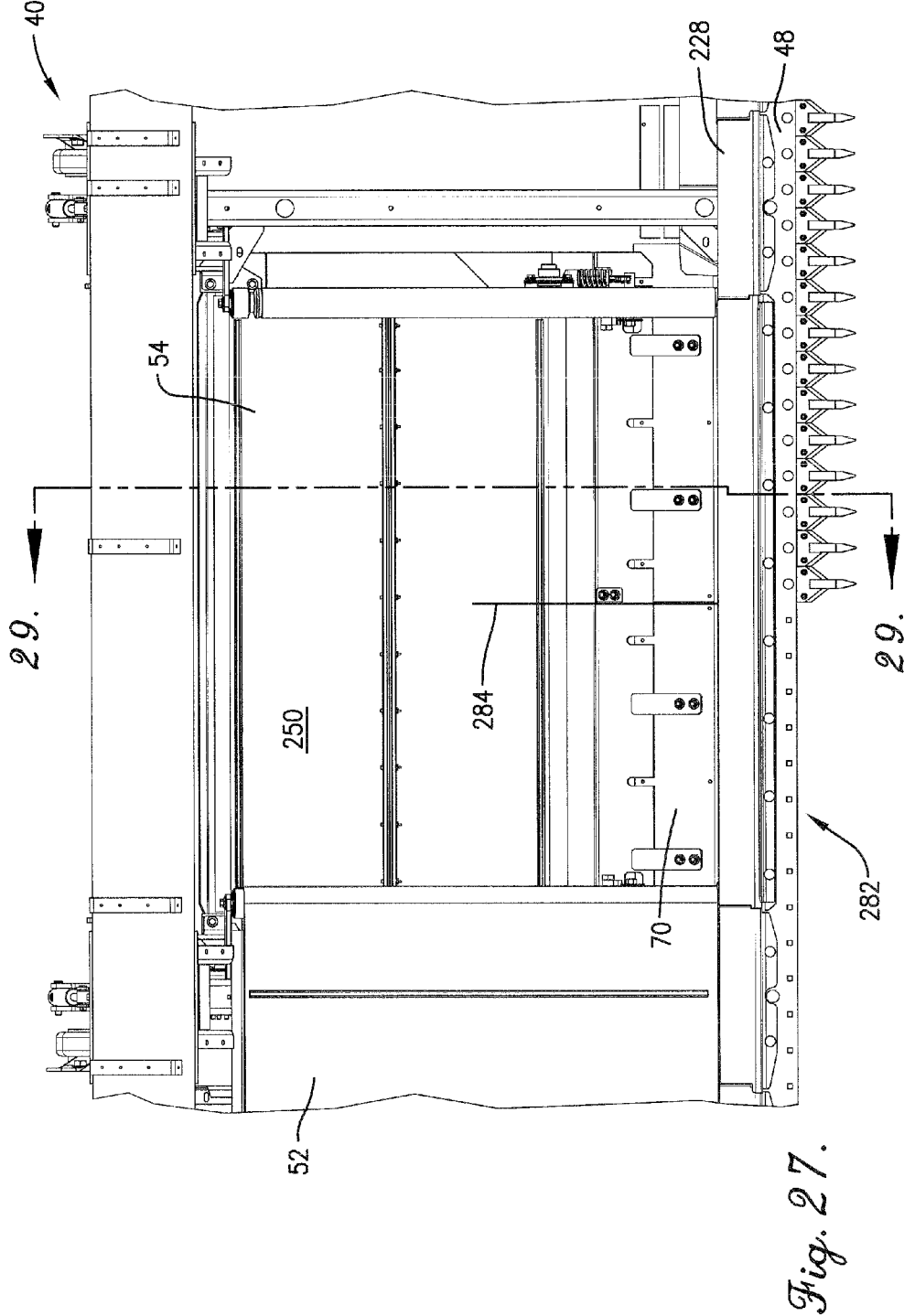
Figure 28:
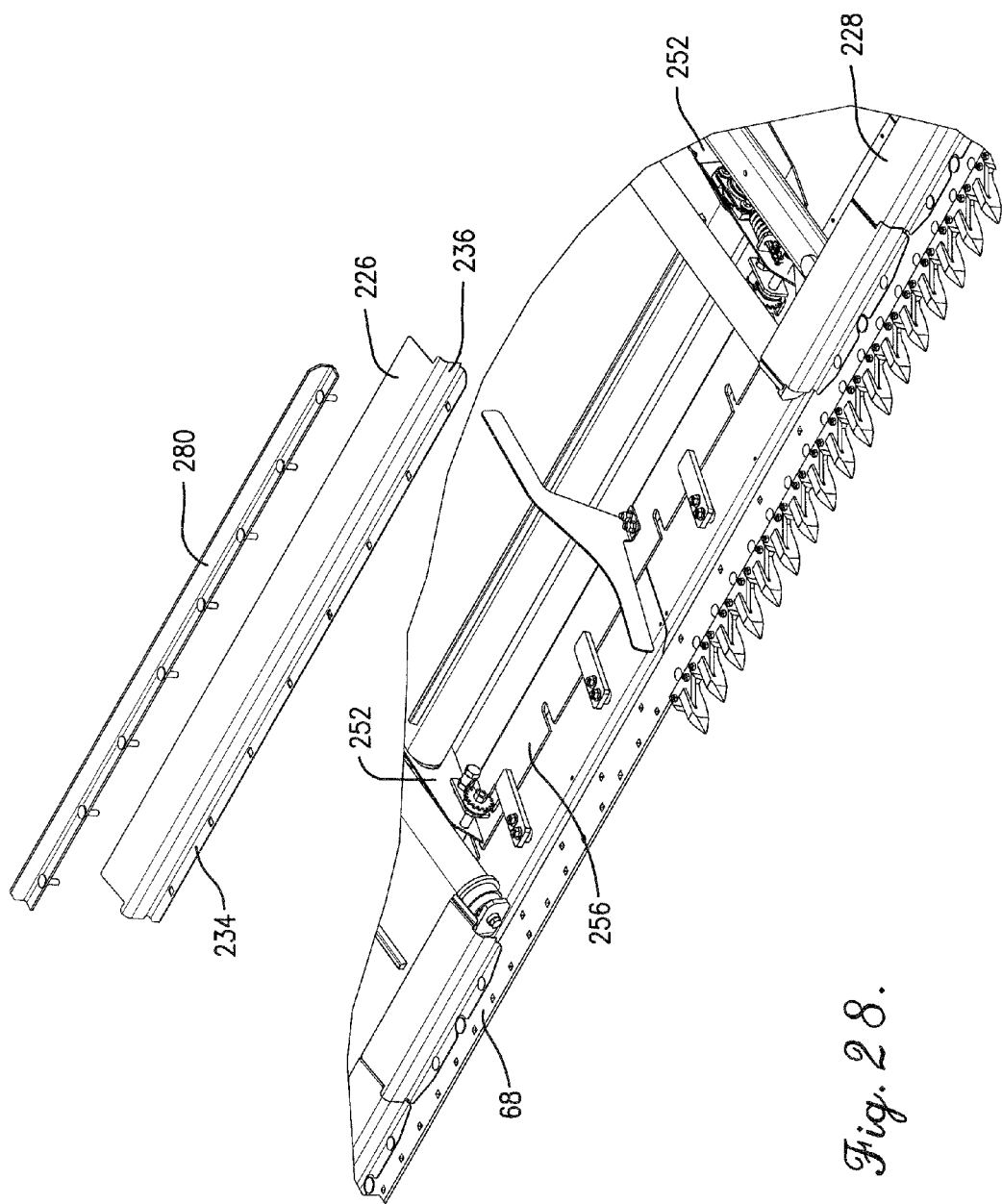
Figure 29:
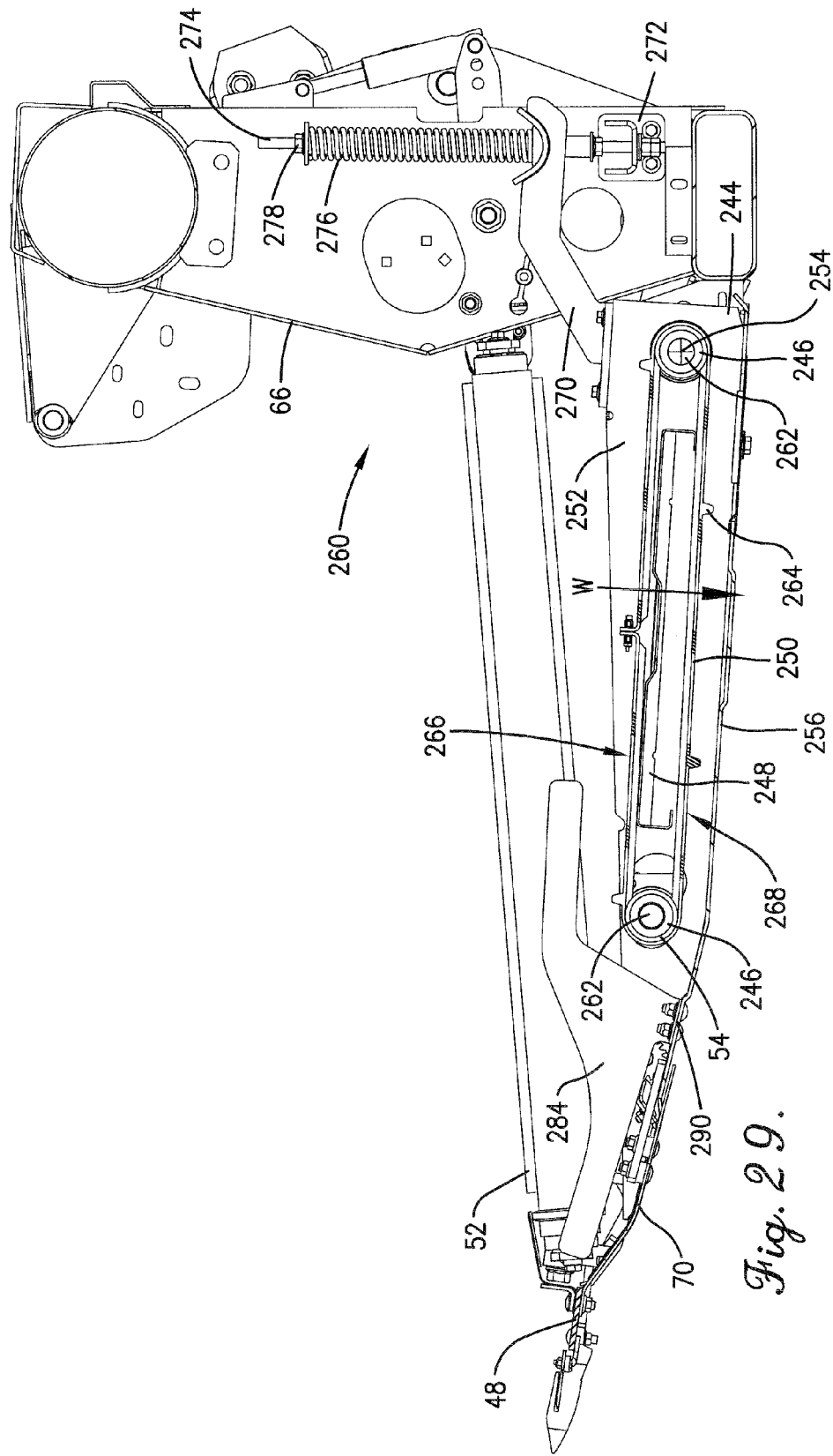
Figure 30:
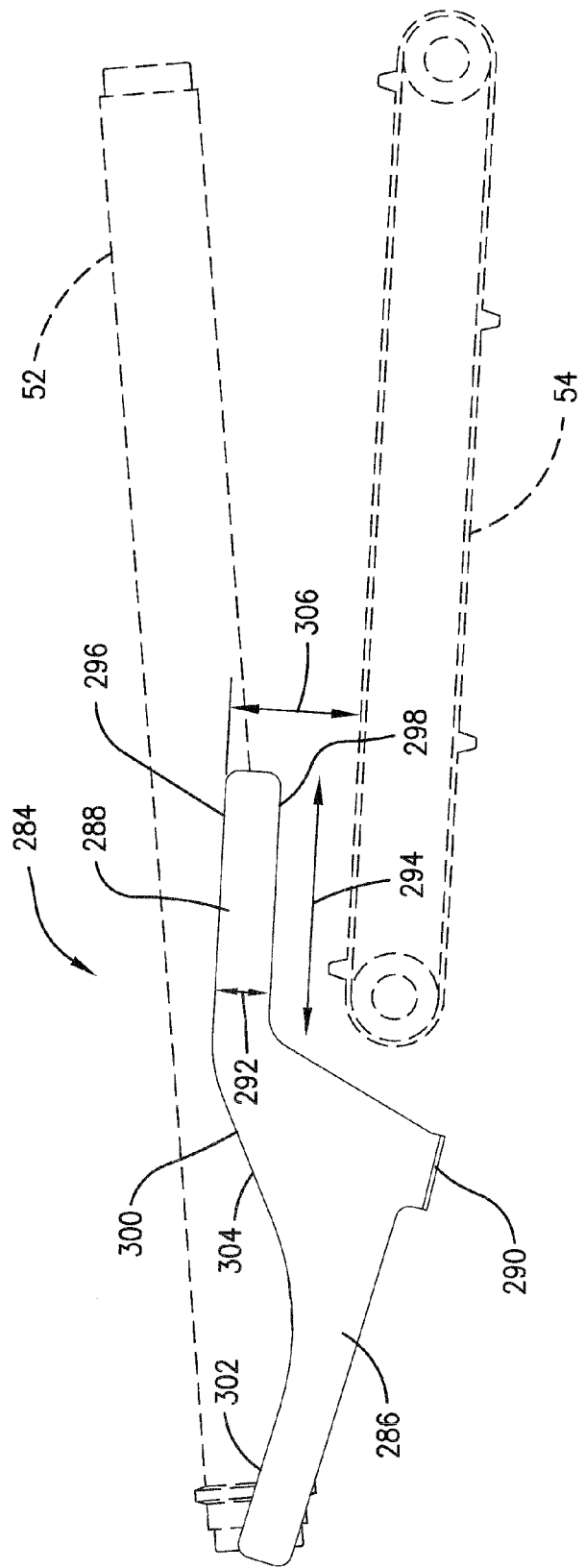
Figure 31:
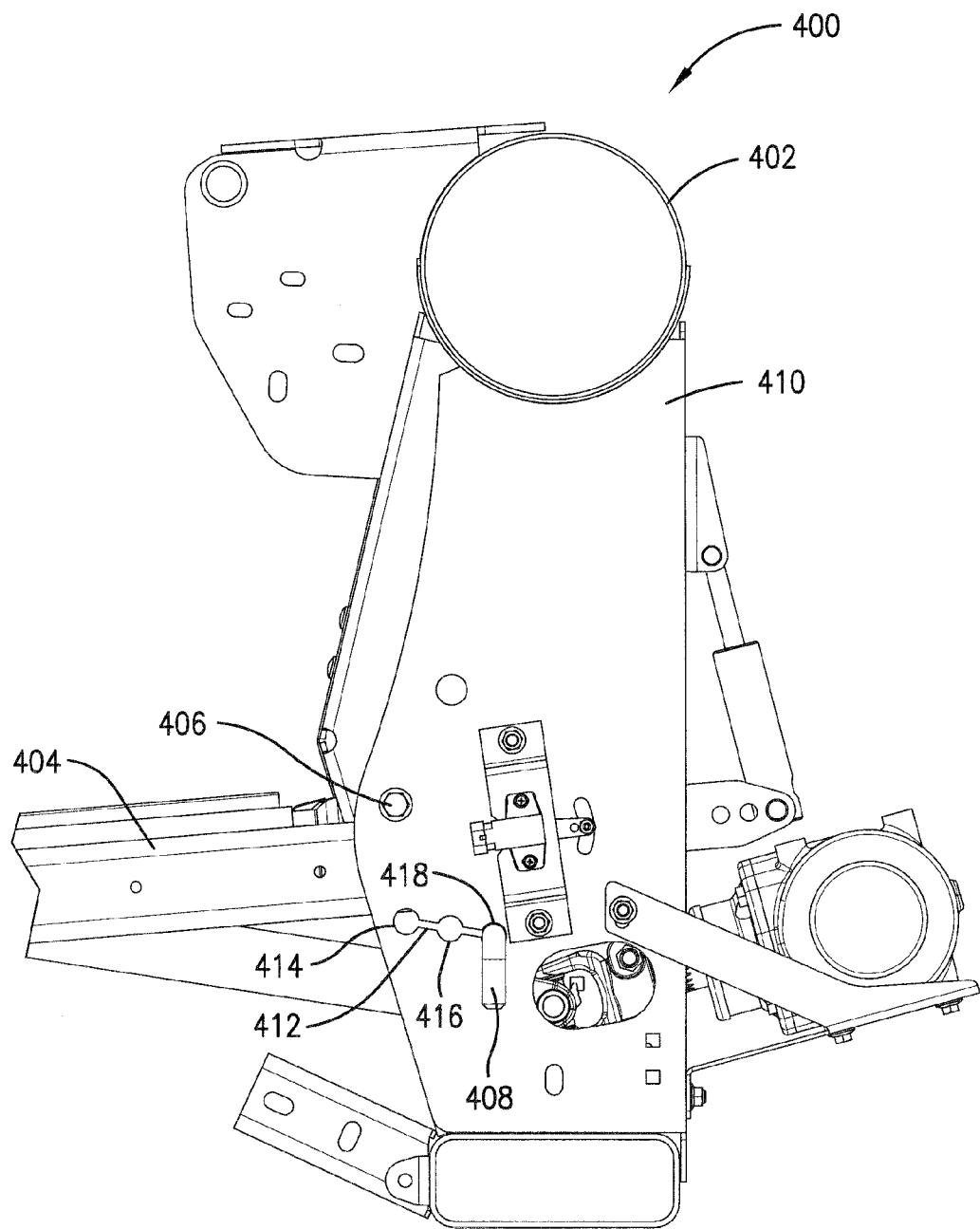

FIG. 3 is an enlarged fragmentary left front perspective view of the harvesting header shown in FIGS. 1 and 2, showing a header frame, draper arms pivotally attached to the header frame and supporting a cutterbar assembly, a left end tilt arm pivotally attached to the header frame and supporting the cutterbar assembly and a cutterbar drive, and a left side draper with a draper belt of the draper assembly removed;

FIG. 4 is an enlarged fragmentary left front perspective view of the harvesting header shown in FIGS. 1-3, showing the end tilt arm pivotally mounted to the header frame and showing pivot adjustment pins attached to the header frame to restrict pivotal movement of the end tilt arm between uppermost and lowermost arm positions, with the illustrated left end tilt arm being in an arm pivoting configuration and in the uppermost arm position;

FIG. 5 is an enlarged fragmentary lower right front perspective view of the harvesting header shown in FIGS. 1-5, showing the left end tilt arm pivotally mounted to the header frame, with the left end tilt arm in the arm pivoting configuration and in the uppermost arm position;

FIG. 6 is a fragmentary left side view of the harvesting header shown in FIGS. 1-5, showing one of the draper arms in the arm pivoting configuration and in the uppermost arm position;

FIG. 7 is a fragmentary left side view of the harvesting header shown in FIGS. 1-6, showing the left end tilt arm in the rigid configuration and in the uppermost arm position, and showing the cutterbar drive supported by the left end tilt arm for up-and-down swinging arm movement, with an epicyclic drive in an uppermost position relative to a rear gearbox;

FIG. 8 is a fragmentary left side view of the harvesting header shown in FIGS. 1-7, showing the left end tilt arm in the arm pivoting configuration and in the uppermost arm position, and showing the laterally extending pivot location of the left end tilt arm;

FIG. 9 is a fragmentary left side view of the harvesting header shown in FIGS. 1-8, showing the left end tilt arm in the arm pivoting configuration and in a lowermost arm position, and showing the epicyclic drive in a lowermost position relative to the rear gearbox;

FIG. 10 is a fragmentary left front perspective view of the harvesting header shown in FIGS. 1-9, showing the left end tilt arm pivotally attached to the header frame and supporting the cutterbar drive, and showing the draper belt of the left side draper;

FIG. 11 is a fragmentary upper right front perspective view of the harvesting header shown in FIGS. 1-10, showing a crop deflector of the left end tilt arm spaced above an outboard end of the left side draper;

FIG. 12 is a fragmentary lower right front perspective view of the harvesting header shown in FIGS. 1-11, showing the left end tilt arm with the cutterbar drive being covered by the crop deflector, showing skid plates of the cutterbar assembly, and showing an end skid of the left end tilt arm;

FIG. 13 is a fragmentary lower left front perspective view of the harvesting header shown in FIGS. 1-12, showing the left end tilt arm with the cutterbar drive being covered by the crop deflector, and showing the skid plates and the end skid;

FIG. 14 is a rear perspective view of the harvesting header shown in FIGS. 1-13, showing an elongated rod of the crop deflector projecting through an opening in an upright panel of the header frame;

FIG. 15 is a fragmentary left rear perspective view of the harvesting header shown in FIGS. 1-14, showing a header sensing system including a pair of left side potentiometers operably coupled to the left end tilt arm and one of the draper arms;

FIG. 16 is a fragmentary right rear perspective view of the harvesting header shown in FIGS. 1-15, showing the header sensing system including a pair of right side potentiometer assemblies operably coupled to a right end tilt arm and another one of the draper arms;

FIG. 17 is an enlarged fragmentary front left perspective view of the harvesting header shown in FIGS. 1-16, showing the potentiometer and linkage of the potentiometer assembly interconnected with a clevis portion of the left end tilt arm;

FIG. 18 is a partly exploded perspective view of the harvesting header shown in FIGS. 1-17, showing the potentiometer and mounting bracket exploded from the header frame and from the left end tilt arm;

FIG. 19 is a schematic view of the header sensing system including the potentiometers and a sensing circuit assembly;

FIG. 20 is a partly exploded perspective right front view of the harvesting header shown in FIGS. 1-18, showing interlocking belt guards of the header in an overhanging relationship to a leading margin of the left side draper;

FIG. 21 is an enlarged fragmentary side view of the harvesting header shown in FIGS. 1-18 and 20, showing the cutterbar assembly and left side draper, with the interlocking belt guards attached to the cutterbar assembly and extending rearwardly to overhang the side draper belt and to extend adjacent to a crop-retaining rib of the side draper belt;

FIG. 22 is a front perspective view of a pair of belt guards shown in FIG. 20, showing the belt guards in an interlocking configuration;

FIG. 23 is a cross-sectional view of the pair of belt guards taken along line 23-23 in FIG. 22;

FIG. 24 is a rear perspective view of the pair of belt guards shown in FIGS. 20, 22, and 23, showing underlying tabs of each of the belt guards positioned in an underlying relationship to the opposite belt guard;

FIG. 25 is a fragmentary left front perspective view of the harvesting header shown in FIGS. 1-18 and 20-21, showing a center draper of the harvesting header spaced between left and right side drapers;

FIG. 26 is a left rear fragmentary perspective view of the harvesting header shown in FIGS. 1-18, 20-21, and 25, showing a counterbalance mechanism of the center draper positioned adjacent to a rear end of the center draper;

FIG. 27 is a top fragmentary view of the harvesting header shown in FIGS. 1-18, 20-21, and 25-26, showing the sliding interconnection between the center draper and the cutterbar assembly, and showing the side drapers in an overlapping relationship with the center draper;

FIG. 28 is a partly exploded right front fragmentary view of the harvesting header shown in FIGS. 1-18, 20-21, and 25-27, showing a central guard and a reinforcing brace of the header exploded away from a central section of the cutterbar assembly, with the central section being spaced in front of the center draper and with the central section extending between laterally outermost margins of the center draper;

FIG. 29 is a left side cross-sectional view of the harvesting header shown in FIGS. 1-18, 20-21, and 25-28, showing the center draper and a center crop deflector spaced forwardly of the center draper, and showing the center draper spaced below the right side draper, and also showing the counterbalance mechanism of the center draper, with the center draper projecting forwardly therefrom;

FIG. 30 is a fragmentary side view of the harvesting header shown in 1-18, 20-21, and 25-29, showing the position of the center crop deflector relative to the center draper and relative to the right side draper; and FIG. 31 is a fragmentary side view of a harvesting header constructed in accordance with a second preferred embodiment of the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1 and 2, the harvesting header selected for illustration comprises a flexible header 40 and a header height sensing system 41. The harvesting header preferably forms part of a harvesting combine. The header 40 is configured for cutting and collecting a crop by being advanced in a generally forward direction D so that the crop can be fed to a feeder house (not shown) and further processed by other components (not shown) of the harvesting machine to produce grain. However, at least some aspects of the present invention could be used in other machines, such as a swather or mower.

The illustrated header 40 broadly includes a header frame 42, draper arm assemblies 44, end tilt arm assemblies 46, cutterbar assembly 48, and draper assembly 50, which includes side drapers 52 and center draper 54. The header 40 also includes a central collecting auger 55 spaced rearwardly of the center draper 54 and a reel (not shown) that extends the length of the header frame 42 and is operable to direct upstanding crop into the header 40. The illustrated cutterbar assembly 48 and draper assembly 50 are preferably flexible so that the header 40 is configured to closely follow an undulating ground contour. However, for some aspects of the present invention, the cutterbar assembly 48 could be substantially inflexible, i.e., where the cutterbar assembly 48 is rigidly mounted relative to the header frame 42. Similarly, there are aspects of the present invention where one, more or all of the drapers 52,54 could be substantially inflexible relative to the header frame 42.

Turning to FIGS. 1-3, the header frame 42 preferably includes an upper beam assembly 56 extending across the entire width of header 40, and a lower beam assembly 58 that likewise extends across the full width of header 40. The header frame 40 further includes a number of upright channels 60 that interconnect beam assemblies 56,58 along the back of header 40 at spaced locations thereacross. Yet further, the header frame 40 includes an end frame member 62 (see FIG. 20) and upright rear panels 64 (see FIGS. 1 and 10) attached along the front side of channels 60. The rear panels 64 cooperatively define an upright rear wall of the header 40, with a centrally located opening 66 (see FIG. 29) being defined by the rear wall and serving as a crop outlet from header 40 to the feeder house (not shown) of the harvester machine upon which header 40 is mounted. Thus, the opening 66 is spaced between left and right sides of the header 40, when the header 40 is viewed from behind, and the opening 66 is preferably centrally located on the header 40.

Turning to FIG. 6, the cutterbar assembly 48 broadly includes a cutterbar 68, skid plates 70, and a sickle assembly 72. The cutterbar 68 comprises a substantially continuous and flexible bar that extends lengthwise along substantially the entire width of the header 40 and thereby extends in a lateral direction relative to the normal direction of travel of the header 40. The skid plates 70 each comprise formed pieces of sheet metal that are secured to a lower side of the cutterbar 68 and are spaced along the length of the cutterbar 68 (see FIG. 5). The underside of each skid plate 70 may be covered with a low friction material (e.g., a panel formed of ultra-high molecular weight polyethylene), if desired. Preferably, the skid plates 70 are spaced apart from one another so as to permit flexing movement of the cutterbar assembly 68. In the usual manner, the sickle assembly 72 is slidably mounted on the cutterbar 68 for severing the crop. As will be discussed further, the cutterbar assembly 48 is operably coupled to the header frame 42 and to drapers 52,54 to cut the crop so that severed crop material falls onto one of the drapers 52,54. Furthermore, severed crop material that falls onto the side drapers 52 is carried by the side drapers 52 onto the center draper 54, which carries crop material rearwardly toward the opening 66.

Adjustable Cutterbar Travel Range for a Flexible Cutterbar Header

Turning to FIGS. 3-9, upright channels 60 each carry a number of arm assemblies 44,46 that project forwardly therefrom, with the arm assemblies 44,46 cooperatively supporting the cutterbar assembly 48 as will be discussed in greater detail. The end tilt arm assembly 46 includes, among other things, a tilt arm 74, a drive bracket 76, an end skid 78, and a spring 80. The tilt arm 74 presents opposite front and rear ends, with the drive bracket 76 and end skid 78 being attached to the front end. The tilt arm 74 includes an arm portion 81 and a clevis portion 82 that forms the rear end and a pivot bushing 84 positioned between the ends. The tilt arm 74 is pivotally mounted to the corresponding channel 60 to pivot about a laterally extending axis, with a bolt that extends through the channel 60 and the pivot bushing 84 to secure the tilt arm 74. The spring 80 is attached to a bracket mounted to the channel 60 and the clevis portion 82 and is operable to urge the rear end of tilt arm 74 downwardly in order to counterbalance loads applied adjacent the front end.

The draper arm assembly 44 includes a draper arm 86 with front and rear ends and a spring 88. The draper arm 86 includes an arm portion 90 and a clevis portion 92 that forms the rear end, with a pivot bushing 94 positioned between the ends. The draper arm 86 is pivotally mounted to the corresponding channel 60 to pivot about a laterally extending pivot axis, with a bolt extending through the channel 60 and the pivot bushing 94 to secure the draper arm 86. The spring 88 is attached to a channel bracket and to the clevis portion 92 and is operable to urge the rear end of draper arm 86 downwardly in order to counterbalance loads applied adjacent the front end. The illustrated springs 80,88 each preferably comprise a hydraulic cylinder that is fluidly coupled to a hydraulic system (not shown) that permits the cylinder to operate as a spring (e.g., where the springs 80,88 are fluidly coupled to a gas-charged accumulator). However, it is also within the scope of the present invention where springs 80,88 include a conventional mechanical spring such as a coil spring. As will be discussed further, the draper arm assemblies 44 cooperatively support side drapers 52.

The arm assemblies 44,46 preferably are pivotally mounted and cooperatively support the cutterbar assembly 48 so that the cutterbar assembly 48 is operable to flex relative to the header frame 42 along the entire length thereof. However, the arm assemblies 44,46 could be alternatively constructed to permit flexing movement of the cutterbar assembly 48 (e.g., where the arm assemblies 44,46 are slidably attached to the header frame 42 and slidable along an upright direction) without departing from the scope of the present invention. The illustrated supporting arm assemblies 44,46 are configured to be selectively pivotal to provide flexible and non-flexible header configurations as will be discussed. In particular, the header 40 includes threaded pins 96 and quick-release pins 98. The threaded pins 96 are each preferably secured above the respective arm assembly 44,46 to restrict upward pivotal movement thereof. The quick-release pins 98 are removably received within corresponding openings 100 presented by the channels 60. The illustrated openings 100 are generally spaced forwardly of the corresponding arm pivot axis and present a pair of pin-receiving sections that define discrete locked and unlocked locations 102,104 for receiving the quick-release pins 98. In the illustrated embodiment, the quick-release pins 98 are preferably located below the corresponding arm assembly 44,46 to restrict downward pivotal movement thereof. While the illustrated pins 96,98 are preferable, other types of pins could be used to restrict pivotal arm movement. Furthermore, other types of stop mechanisms could be used to selectively provide limited arm movement without departing from the scope of the present invention. For example, the pins 96,98 could be mounted on the arm assemblies 44,46, with the channels 60 presenting pin engaging surfaces and with pins 96 or 98 being selectively positionable among locations on the arm to provide selective pivoting movement.

Each tilt arm 74 and draper arm 86 preferably comprises a single arm, but could take another form, such as a four-bar linkage as shown in U.S. Patent Publication No. 2007/0193243, published Aug. 23, 2007, entitled COMBINE HARVESTER DRAPER HEADER HAVING FLEXIBLE CUTTERBAR, which is hereby incorporated in its entirety by reference herein.

Turning to FIGS. 7-9, the arm assemblies 44,46 are configured to shift between an uppermost fixed position and a lowermost position. In the uppermost fixed position, the quick-release pin 98 can be selectively secured in the locked location 102 so that the arm assembly 46 is in a rigid arm configuration and is restricted from pivoting, with the header 40 thereby being in the non-flexible header configuration. With the quick-release pin 98 secured in the unlocked location 104, the arm assembly 46 is in an arm pivoting configuration and is permitted to pivot through a limited range of angular movement, with the cutterbar assembly 48 having a corresponding range of generally vertical movement, so that the header 40 is in the flexible header configuration. Preferably, the cutterbar assembly 48 has a range of vertical movement of about eight (8) inches, but it is within the scope of the present invention where that the range of vertical movement is greater or smaller.

Flexible Draper and Cutterbar with Tilt Arm for Cutterbar Drive

Turning to FIGS. 10-14, each of the end tilt arm assemblies 46 is pivotally mounted adjacent to opposite ends of the header frame 42 and is supported for selective pivotal movement. As discussed above, the arm assemblies 44,46 are attached to and cooperatively support the cutterbar assembly 48. The illustrated cutterbar 68 is flexible and supports the sickle assembly 72. In particular, the sickle assembly 72 comprises a split sickle that includes a pair of flexible sickle bars 106 and knives 108 that are attached to and spaced along the length of the flexible sickle bars 106. The sickle assembly 72 also includes knife guards 110 attached to the cutterbar 68, with the sickle bars 106 and knives 108 being operable to slide in a reciprocating manner relative to the cutterbar 68 and flex with the cutterbar 68. The sickle bars 106 preferably reciprocate in opposite directions relative to one another. However, it is within the scope of the present invention for the cutterbar assembly 48 to include a single continuous sickle bar. Again, the cutterbar 68 also supports the spaced-apart skid plates 70 that extend below the cutterbar 68 and are configured to engage the ground and thereby cause flexing movement of the cutterbar 68.

Turning to FIGS. 8-14, the header 40 further includes a pair of cutterbar drive assemblies 112 that are attached to respective ones of the end tilt arm assemblies 46 and serve to power the sickle assembly 72. The cutterbar drive assembly 112 broadly includes a gear drive 114, a telescopic drive shaft 116, universal joints 118, and a forward gear box in the form of epicyclic drive 120.

The epicyclic drive 120 includes a gear box with input and output shafts 122,124, with the output shaft 124 being drivingly attached to a corresponding one of the sickle bars 106. The epicyclic drive 120 serves to offset the inertial forces of the sickle during its abrupt acceleration and deceleration at opposite ends of its path of travel. While the illustrated epicyclic drive 120 is preferred, for at least some aspects of the present invention, another type of drive could be used to transfer power to the sickle bar 106 without departing from the scope of the present invention. Additional details of the preferred epicyclic drive 120 are disclosed in issued U.S. Pat. No. 7,121,074, issued Oct. 17, 2006, entitled BALANCED EPICYCLIC SICKLE DRIVE, which is hereby incorporated in its entirety by reference herein.

The epicyclic drive 120 is attached to the drive bracket 76 so as to be fixed to the end tilt arm assembly 46 and be pivotal about a laterally extending axis therewith. The gear drive 114 includes input and output shafts 126,128 (see FIG. 5) and is mounted to the header frame 42 with bracket 130. The telescopic drive shaft 116 is drivingly connected to the input shaft 122 of drive 120 and the output shaft 128 of drive 114 with universal joints 118, with the telescopic drive shaft 116 extending through an opening in the tilt arm 74. The input shaft 126 of gear drive 114 is powered by a power take-off shaft (not shown) of the harvesting machine. In this manner, the illustrated shaft-driven cutterbar drive assembly 112 powers the sickle assembly 72. For at least some aspects of the present invention, another type of transmission, e.g., a belt drive, or hydraulic drive, for transmitting power to the epicyclic drive 120 and to the sickle assembly 72 may be used instead of the preferred shaft drive of the illustrated embodiment.

The illustrated drive assembly 112 is preferably attached to and partly supported on the end tilt arm assembly 46, with the epicyclic drive 120 and telescopic drive shaft 116 being configured to pivot with the end tilt arm assembly 46. In particular, the universal joints 100 permit relative pivotal movement between the epicyclic drive 120 and the gear drive 114. Furthermore, the telescopic drive shaft 116 permits relative lateral movement between the drives 114,120. Although the illustrated drive assembly 112 is preferably attached to the end tilt arm assembly 46, it is also within the scope of the present invention where the drive assembly 112 is attached to an inboard pivotal arm, such as one of the draper arm assemblies 44.

In addition, the end skid 78 of the end tilt arm assembly 46 is spaced apart from the adjacent skid plate 70. In this manner, the end tilt arm assembly 46 is operable to shift relative to the inboard adjacent draper arm assembly 44 while the adjacent arm assemblies 44,46 cooperatively support the cutterbar assembly 48. Thus, the arm assemblies 44,46 are configured to substantially independently pivot with the cutterbar assembly 48 when the header 40 is advanced over uneven terrain.

The illustrated orientation and configuration of the cutterbar drive assembly 112 preferably provides a substantially smooth constant rotational velocity of the output shaft 124. In particular, the epicyclic drive 120 is spaced above an axis of the tilt arm 74 and the gear drive 114 is spaced below the tilt arm axis, with the drive shaft 116 extending through the tilt arm opening. The output shaft 128 of the gear drive 114 rotates at a uniform rotational velocity and drives the universal joint 100, which drives the drive shaft 116. However, due to the angle between the output shaft 128 and the drive shaft 116, it has been found that the universal joint 100 drives the drive shaft 116 at a non-uniform rotational velocity. In the illustrated embodiment, the input shaft 122 of the epicyclic drive 120 is angled relative to the drive shaft 116 at an angle α and the output shaft 128 of the gear drive 114 is angle relative to the drive shaft 116 at an angle β (see FIG. 9). However, it has been determined that the illustrated arrangement of drives 114,120 and drive shaft 116, with the illustrated angles α,β therebetween, the use of a universal joint 100 between the drive shaft 116 and drive 120 unsubstantially cancels out any non-uniformity in the rotational velocity so that the output shaft 124 provides a uniform rotational velocity. The cutterbar drive assembly 112 pivots so that the angle α lies within an angular range. Preferably, the angle β generally falls within that angular range so that the rotational velocity of the output shaft 124 remains substantially uniform as the cutterbar drive assembly 112 is operated.

Flexible Draper and Cutterbar Having Shiftable Crop Divider with Deflector

Turning to FIGS. 3, 10-14, and 25-26, the header 40 includes side drapers 52 and center draper 54 that are both positioned behind the cutterbar assembly 48. As will be discussed further, the side drapers 52 are spaced on either side of the center draper 54 and are configured to direct severed crop material from locations along the cutterbar assembly 48 to the center draper 54. Each side draper 52 broadly includes oppositely spaced inboard and outboard rollers 132,134, belt support panels 136, a side draper belt 138, and a belt tensioning mechanism 140.

Each of the rollers 132,134 is rotatably mounted to a corresponding draper arm assembly 44. In particular, the inboard rollers 132 are rotatably mounted to draper arm assemblies 44 with brackets 142 and thereby extend adjacent a respective laterally outermost side margin of the center draper assembly 54 (see FIG. 25). The outboard rollers 134 are rotatably and slidably mounted to respective draper arm assemblies 44 with the belt tensioning mechanism 140. The belt tensioning mechanism 140 includes slides 144 that interconnect and permit relative sliding movement between the draper arm 86 and the roller 134 for tensioning the side draper belt 138. The rollers 132,134 are preferably mounted so as to pivot with the respective draper arm assemblies 44 about the lateral arm pivot axis.

The belt support panels 136 are elongated metal strips that extend laterally between the rollers 132,134. The belt support panels 136 are cooperatively supported by respective draper arm assemblies 44 and serve to evenly support the weight of the side draper belt 138 and any severed crop material on the side draper belt 138. As will be discussed in greater detail, the side draper belt 138 is an endless belt that is particularly configured for conveying the severed crop material toward the center draper 54. The side draper belt 138 is rotatably mounted to surround the rollers 132,134 and the corresponding draper arm assemblies 44, with the side draper belt 138 presenting opposite endmost margins defined by the rollers 132,134. Furthermore, the side draper belt 138 presents upper and lower runs, with the upper run extending over the belt support panels 136 so that the panels 136 restrict the upper run from sagging. The lower run of the side draper belt 138 extends below the panels 136. The outboard roller 134 is powered by a drive (not shown), with the outboard roller 134 driving the side draper belt 138 so that an upper run of the side draper belt 138 moves inwardly toward the center draper 54. While the illustrated embodiment includes left and right side drapers 52, it is within the scope of the present invention, for at least some aspects of the present invention, where an alternative conveyor mechanism is used. For instance, multiple end-to-end side drapers could be used to convey crop material. Also, a conventional auger conveyor could be used in some of the inventive aspects to convey crop material.

Turning to FIGS. 11-14, the end tilt arm assembly 46 further includes a crop divider 146 that serves to direct crop into the header 40 and deflect severed crop material onto the side draper 52. The crop divider 146 operates as a substantially unitary structure and includes a divider panel 148 that presents front and rear ends, an end bracket 150 that secures a forwardmost tip of the divider panel 148 to an arm bracket 152 of the end skid 78, and an elongated support 154 that is fastened to an underneath surface of the divider panel 148 and extends rearwardly from the rear end of the divider panel 148.

The divider panel 148 also includes inner and outer walls 156,158 that are joined along a top margin of the divider panel 148 to cooperatively form a hollow body, with the inner wall 156 including an upright section 160 and a deflector section 162 that is angled relative to the upright section 160. The inner wall 156 also presents a lowermost margin 164 that extends between the front and rear ends of the divider panel 148. The walls 156,158 extend rearwardly from the forwardmost tip of the divider panel 148, with the walls 156,158 cooperatively presenting a generally expanding wall structure in the rearward direction.

The elongated support 154 includes a rod section that is shiftably received in an opening 166 presented by one of the upright rear panels 64. Thus, the front end of the divider panel 148 is supported by the end skid 78, with the rear end being supported by the header frame 42 so that the rod section can pivot and slide relative to the header frame 42. As the end tilt arm assembly 46 pivots up or down, the crop divider 146 also pivots in the same direction.

Furthermore, the divider panel 148 is preferably positioned so that the lowermost margin 164 is spaced apart from the adjacent side draper belt 138 as the end tilt arm assembly 46 pivots between the uppermost and lowermost positions. The divider panel 148 is positioned to extend over part of the side draper belt 138 and encourage severed crop material to fall onto the side draper belt 138. In addition, the divider panel 148 is spaced to permit sliding adjustment of the outboard roller 134, e.g., for tensioning or maintenance of the side draper belt 138.

Header Height Control System with Multiple Potentiometer Input

Turning to FIGS. 15-19, the header height sensing system 41 provides feedback to a header height adjustment system (not shown) for controlling the height of the header 40. The header height sensing system 41 includes a plurality of potentiometer assemblies 168 and an electronic module 170 that are operably coupled to one another, with the potentiometer assemblies 168 being operably coupled to respective arm assemblies 44,46. The potentiometer assemblies 168 each include a potentiometer 172, a mounting bracket 174, and a linkage 176. In the usual manner, the potentiometer 172 includes a sensor arm 178 that pivots to control the voltage output of the potentiometer 172. The potentiometer 172 is attached to a corresponding channel 60 adjacent to the pivot of the arm assembly 44,46 using the mounting bracket 174. The linkage 176 directly interconnects the sensor arm 178 and the clevis portion 92, with the potentiometer 172 providing an output signal associated with the angular position of the arm assembly 44,46. The arm position signal is also associated with the generally vertical position of a portion of the cutterbar assembly 48 adjacent a forward end of the arm assembly 44,46. As the arm assembly 44,46 swings upwardly or downwardly, the linkage 176 causes the sensor arm 178 to swing accordingly, with the arm position signal, i.e., the voltage output, of the potentiometer 172 changing accordingly. In this manner, the potentiometer 172 is operable to sense movement of the adjacent portion of the cutterbar assembly 48 as the header 40 moves over uneven terrain.

For each of the arm assemblies 44,46 having a potentiometer 172 to sense pivotal arm movement and provide an arm position signal, the potentiometer 172 is preferably only coupled to sense movement of that particular arm. However, it is also within the scope of the present invention where the movement of multiple arm assemblies 44,46 is sensed by the same transducer. While the illustrated potentiometer 172 is preferable for sensing angular movement of the arm assembly 46, it is also within the ambit of the present invention to use other types of transducers to sense angular arm movement, such as an angular encoder.

In the illustrated embodiment, four potentiometers 172a, 172b, 172c, 172d are preferably installed on the header 40 to sense angular arm movement of respective arm assemblies 44,46 and provide corresponding arm position signals, with two potentiometers 172a,172b on the left side of the header 40 and two potentiometers 172c,172d on the right side of the header 40 (see FIGS. 15 and 16). Preferably for each side of the header 40, one potentiometer 172 is installed to sense movement of the end tilt arm assembly 46 and provide a corresponding end tilt arm position signal and another is installed to sense movement of an inboard one of the draper arm assemblies 44 and to provide a corresponding draper arm position signal. However, other sensing configurations could be used without departing from the scope of the present invention. For instance, more than two potentiometers 172 could be installed on each side of the header 40. For example, three (3) potentiometers 172 could be installed on each side of the header 40, with one associated with the end tilt arm assembly 46 and two associated with corresponding draper arm assemblies 44. Furthermore, a plurality of sensors could be installed so that each arm assembly 44,46 has a respective potentiometer 172 associated therewith, with the system 41 thereby being operable to sense the angular arm movement of all of the arm assemblies 44,46 and provide arm position signals corresponding to the position of the arm assemblies 44,46.

Turning to FIG. 19, the electronic module 170 is operable to provide an output signal to the harvesting machine for controlling the header height when the header 40 is in the flexible header configuration. As will be discussed, the electronic module 170 provides the output to indicate when a controller (not shown) of the harvesting machine should automatically raise the header 40, e.g., by hydraulically raising the feeder house. The illustrated electronic module 170 includes a pair of minimum input voltage selector circuits 180. Each selector circuit 180 includes a pair of buffer circuits 182 that each receive an output signal from the corresponding potentiometer 172, with each buffer circuit 182 including resistors 184,186, diodes 188, and operational amplifier 190. Preferably, the resistors 184 are 470 k-ohm resistors, the resistors 186 are 1 k-ohm resistors, the diodes 188 are 1N4004 diodes, and the operational amplifiers 190 are TS924IN op amps. The selector circuit 180 also includes selector diodes 192 electrically coupled to the output of respective buffer circuits 182 and each electrically coupled to the input of another operational amplifier 194. The selector circuit further includes pull-up resistors 196 and feedback diode 198. Preferably, the diodes 192 are 1N4004 diodes, the operational amplifiers 194 are TS924IN op amps, and the resistors 196 are 220 k-ohm resistors. The module 170 also includes a potentiometer circuit 200 that is preferably coupled to all of the potentiometers 172, via common nodes 202,204. The circuit 200 includes a zener diode 206 and capacitors 208,210. Preferably, the capacitor 208 is a 0.1 microfarad capacitor and the capacitor 210 is a 10 microfarad capacitor.

The illustrated arrangement of selector diodes 192 cooperatively provide a selected voltage signal to the operational amplifier 194 that is substantially the same as the lowest of the output signals received from corresponding potentiometers 172 by the corresponding buffer circuits 182. The operational amplifier 194 provides an output signal of the corresponding selector circuit 180 that is substantially the same as the selected voltage signal. In this manner, the selector circuit 180 selects the lowest one of analog voltage signals provided by the respective potentiometers 172 and provides a corresponding selected analog output signal at selector output 211. However, it is also within the scope of the present invention where the circuit provides another signal, e.g., where the circuit selects the highest one of the voltage signals and provides a corresponding signal output. Furthermore, the circuit could provide another signal, e.g., a digital signal, that corresponds to a selection of one of the voltage signals provided by the potentiometers 172.

The illustrated potentiometers 172 preferably provide an input voltage to the module 170 that ranges from about 0.5 volts to about three (3) volts based on the position of the arm assembly 44,46 and the corresponding vertical position of the adjacent portion of the cutterbar assembly 48. In particular, the potentiometers 172 provide a voltage of about three (3) volts corresponding to the arm assembly 44,46 being in the lowermost arm position and about 0.5 volts corresponding to the arm assembly 44,46 being in the uppermost arm position. Again, the illustrated cutterbar assembly 48 has a range of generally vertical travel of about eight (8) inches when the arms swing between the uppermost and lowermost positions. Therefore, vertical movement of the cutterbar assembly 48 through that range of travel causes the potentiometers 172 to range between about 0.5 volts to about 3 volts.

The module 170 provides selected signal outputs that correspond to the position of the cutterbar assembly 48. In particular, potentiometers 172a,172b are operable to sense the position of a left side section of the cutterbar assembly 48 and potentiometers 172c,172d are operable to sense the position of a right side section of the cutterbar assembly 48. Furthermore, the selector circuits 180 each provide a selector signal associated with the highest position of the arms corresponding to respective potentiometers 172. In this manner, the selector circuits 180 each provide a single cutterbar position signal associated with the highest vertical position of that section of the cutterbar assembly 48.

The potentiometers 172, module 170, and header height adjustment system cooperate so that the controller of the harvesting machine automatically raises the header 40 when at least one of the arm assemblies 44,46 pivots above a predetermined angular position. Preferably, the header height adjustment system controls the header 40 in response to the cutterbar position signals received from the module. Preferably, when a voltage of one of the potentiometers 172 goes below a threshold level of about 1.5 volts, which voltage corresponds to the cutterbar assembly 48 being positioned approximately four (4) inches from the uppermost position, the controller preferably raises the header 40. However, for some aspects of the present invention, the output from the module 170 could be used for other purposes, such as triggering a warning indicator for an operator.

Draper Belt with Crop-Retaining Rib

Turning to FIGS. 20 and 21, the side draper belt 138 comprises an endless belt that includes a belt body 212 and presents leading and trailing belt margins 214,216. The side draper belt 138 further includes a plurality of fore-and-aft extending crop-engaging slats 218 projecting outwardly from an outer surface of the belt body 212 and extending between the belt margins 214,216. Yet further, the side draper belt 138 preferably includes an endless crop-retaining rib 220 that projects from the outer surface of the belt body 212. The rib 220 includes a cross-sectional shape that is preferably constant along its length and tapers outwardly toward an outermost tip. Preferably, the rib 220 projects at least about one-half inch from the outer surface of the belt body 212. The crop-retaining rib 220 preferably endlessly extends adjacent to the leading belt margin 214 so that the rib 220 is spaced between the margin 214 and the slats 218. However, it is also within the ambit of the present invention where the side draper belt 138 is alternatively configured to carry crop material. For instance, the side draper belt 138 could include a plurality of crop-retaining ribs 220, or the rib 220 could be formed in segments to present discrete rib sections.

The side draper belt 138 is rotatably received onto the rollers 132,134 so as to define upper and lower belt runs 222,224, with the upper belt run 222 operable to move toward the center draper 54. Preferably, the arm assemblies 44,46 are positioned so that the side draper belt 138 slopes downwardly toward the leading belt margin 214. In this manner, any severed crop material supported on the upper belt run 222 is urged by gravity toward the leading belt margin 214, with the crop-retaining rib 220 being configured to catch the crop material and restrict the crop material from falling off of the upper belt run 222 until the crop material is disposed onto the center draper 54.

Interlocking Belt Guards for a Draper Header

Turning to FIGS. 20-28, the header 40 further includes a flexible belt guard assembly with a central guard 226 and a plurality of interlocking belt guards 228, with the belt guards 228 extending along the leading belt margins 214. Each belt guard 228 is preferably unitary and comprises a formed piece of sheet metal that presents opposite first and second ends 230,232. The belt guard 228 includes a lower flange section 234, an upright section 236, and an upper overhanging section 238, all of which extend substantially from the first end 230 to the second end 232. The belt guard 228 also includes a rear tab 240 projecting from the overhanging section 238 at the first end 230 and a front tab 242 projecting from the upright section 236 at the second end 232. The central guard 226 and an endmost belt guard 243 also include sections 234,236,238, with the central guard 226 including tabs 242, and the endmost belt guard 243 including a tab 240 on one end thereof.

The belt guards 228 are configured to be attached to the cutterbar 68 by fasteners that extend through holes in the flange section 234. Pairs of belt guards 228 can be mated to each other by positioning the rear tab 240 of one belt guard 228 underneath the overhanging section 238 of the other belt guard 228. Furthermore, the front tab 242 of the other belt guard 228 is positioned underneath the upright section 236 of the one belt guard 228. In this manner, each pair of mated belt guards 228 have mating ends that cooperatively form an interlocking joint so that the mating ends each restrict relative up-and-down movement of the other mating end. However, the interlocking joint preferably permits relative angular movement between mated pairs of belt guards 228 and also permits a limited amount of relative lateral movement between mated pairs of belt guards 228 in the direction along the leading belt margin 214. In addition, the illustrated pairs of mated belt guards 228 preferably are configured so that uppermost surfaces presented by the overhanging sections 238 are substantially flush with one another and thereby minimize any resistance to crop flow provided by the belt guards 228.

Interlocking Belt Guards and the Crop-Retaining Rib

Turning to FIG. 21, the belt guards 228 extend rearwardly and upwardly from the cutterbar 68 and extend over the leading belt margin 214. The belt guards 228 also preferably extend over and adjacent to the crop-retaining rib 220. While the illustrated belt guards 228 and crop-retaining rib 220 are slightly spaced apart, it is within the scope of the present invention where some sliding contact occurs therebetween. In particular, the overhanging sections 238 present a downwardly facing surface that extends in close proximity along the tip of the rib 220. Preferably, the gap between the surface and the tip is less than about one-quarter of an inch. In this manner, the belt guards 228 and the crop-retaining rib 220 cooperatively form a joint that restricts severed crop material from falling between the cutterbar 68 and the leading belt margin 214.

Spring Flotation for Center Deck of Draper Header

Turning to FIGS. 25-30, center draper 54 serves to collect severed crop material from the side drapers 52 and carry the material in a rearward direction toward the opening 66 and toward the feeder house of the harvesting machine. The center draper 54 broadly includes a draper chassis 244, front and rear rollers 246, belt support 248, and center draper belt 250. The draper chassis 244 includes a pair of side plates 252 that are pivotally mounted to corresponding channels 60 and pivot about pivot axis 254. The draper chassis 244 further includes a floor panel 256 that is connected to and extends along a bottom margin of the side plates 252. Thus, the side plates 252 and floor panel 256 cooperatively pivot about the pivot axis 254. The illustrated draper chassis 244 preferably presents a lateral width, measured from one side plate 252 to the other, of at least about five (5) feet and, more preferably about 6 feet, but it is also within the scope of the present invention where the draper chassis 244 is larger or smaller than the illustrated embodiment.

The floor panel 256 also presents a forward margin 258 that is secured to the corresponding skid plates 70 with multiple fasteners. In particular, the fasteners each include a rearwardly extending finger that is spaced upwardly from the skid plate 70 to present an elongated slot, with the finger being attached at a forward end thereof with fasteners. The forward margin 258 is slidably received within the slot to create a sliding joint that permits relative fore-and-aft sliding movement between the floor panel 256 and the skid plates 70 and restricts relative vertical movement therebetween. The draper chassis 244 also includes a counterbalance mechanism 260 for supporting the center draper 54 as will be discussed further.

The rollers 246 are rotatably mounted between the side plates 252 by mounting the rollers 246 on respective shafts 262 and by mounting the shafts 262 onto bearings (not shown) secured in the side plates 252. The belt support 248 is attached to the side plates 252 and is spaced between the rollers 246. The center draper belt 250 comprises an endless belt with a belt body and a plurality of crop-engaging slats 264. The center draper belt 250 presents upper and lower runs 266,268. The lower run 268 extends below the belt support 248 and the upper run 266 extends above the belt support 248, with the belt support 248 being operable to restrict sagging of the upper run 266. The draper belt 250 is driven by the rear shaft 262, which is powered by a drive (not shown) so that the upper run 266 is configured to normally move in a rearward direction and the lower run 268 is configured to normally move in a forward direction. However, it is also within the scope of certain aspects of the present invention where the belt rotation direction is reversed so that the upper run 266 moves forwardly and the lower run 268 moves rearwardly (such that crop is conveyed by the lower run). While the illustrated center draper 54 is preferably centrally located relative to the rest of the header 40, it is also within the scope of the present invention where the center draper 54 is located toward one side of the header 40.

Turning to FIG. 29, the counterbalance mechanism 260 serves to support the center draper 54 by counteracting the weight of the center draper 54 about the pivot axis 254. The counterbalance mechanism 260 includes a lever 270, mounting lug 272, rod 274, and compression spring 276. The lever 270 is attached to a rear end of the corresponding side plate 252 and extends rearwardly through the opening 66. The mounting lug 272 is attached to an inner wall of the adjacent channel 60 and is spaced below the lever 270. Adjacent a lower end thereof, the rod 274 is secured to the mounting lug 272 and extends up through a rear end of the lever 270 and through the spring 276. A stop 278 is secured adjacent to an upper end of the rod 274, with the spring 276 being captured between the rear end of the lever 270 and the stop 278. Thus, the spring 276 is operable to bias the lever 270 in a generally downward direction. The generally downward spring force provided by the spring 276 counteracts the weight W of the center draper 54 so that the spring 276 reduces the load that the center draper 54 applies to the skid plates 70 and to the cutterbar assembly 48.

The center draper 54 collects severed crop material from the side drapers 52 by being generally spaced below the side drapers 52. Furthermore, inboard ends of the side drapers 52 overhang corresponding laterally outermost side margins of the center draper 54 so as to restrict crop material from falling between the drapers 52,54 (see FIG. 27).

Draper Head with Flexible Cutterbar Having Rigid Center Section

Turning to FIGS. 25-29, the cutterbar assembly 48 further includes an elongated brace 280 that comprises a substantially uniform length of angle iron. However, it is also within the scope of the present invention to use another structure with some vertical dimension to resist bending of the cutterbar assembly 48 caused by gravity or other loads. For instance, the brace 280 could include an L-shaped beam made from a material other than steel, or a beam having another cross-sectional shape, e.g., a box shape, that serves to rigidify the cutterbar assembly 48. The brace 280 is positioned to lie on top of the flange section 234 of central guard 226 and engage the upright section 236. Fasteners secure the brace 280 and central guard 226 to the cutterbar 68 and thereby define an inflexible length 282 of the cutterbar assembly 48 between ends of the central guard 226. In other words, the brace 280 and central guard 226 cooperatively restrict the cutterbar assembly 48 from bending along the inflexible length 282.

The center draper 54 includes laterally outermost side margins that are spaced so that the inflexible length 282 extends between the margins. The center draper 54, particularly the rollers 246, flex to only a minimal degree along the length of the cutterbar 68. Therefore, because the illustrated cutterbar assembly 48 is preferably rigid along the inflexible length 282, the front roller 246 and the inflexible length 282 cooperatively maintain a substantially uniform spacing between a forward end of the draper belt 250 and the cutterbar assembly 48 so that the cutterbar 68 and center draper 54 generally move together with one another. In this manner, the inflexible length 282 permits the center draper 54 to travel over uneven terrain without parts of the center draper 54, such as the draper belt 250, contacting the side drapers 52 and without the center draper 54 damaging itself.

Center Crop Deflector for Draper Header

Turning to FIGS. 25-30, the center draper 56 also includes a center crop deflector 284 that is substantially unitary and is operable to direct crop material from the side drapers 52 so that crop flow from one side draper 52 to the other is restricted. The center crop deflector 284 includes a substantially flat plate with front and rear deflector portions 286,288 and also includes a lower flange 290. The rear deflector portion 288 preferably presents a height 292 of at least about one (1) inch so that the rear deflector portion 288 resists bending relative to the front deflector portion 286. The rear deflector portion 288 also presents a portion length 294 in the range of about one (1) inch to about six (6) inches. The rear deflector portion 288 preferably presents upper and lower edges 296, 298 that are substantially linear. The front deflector portion 286 presents an upper edge 300 that includes a lower section 302 that is substantially linear and a curvilinear transition section 304 defined between the lower section 302 and the upper edge 296 of the rear deflector portion 288.

The flange 290 of the center crop deflector 284 is attached to the forward margin 258 of the floor panel 256, with the front deflector portion 286 extending forwardly up to the cutterbar assembly 48 and the rear deflector portion 288 extending over the draper belt 250. Preferably, the rear deflector portion 288 extends over the draper belt 250 a length less than half the length of the upper run 266. More preferably, the length of extension over the draper belt 250 ranges from about one (1) inch to about six (6) inches. Also, the upper edge 296 of the rear deflector portion 288 is preferably spaced above the draper belt 250 a distance 306 in the range of about three (3) inches to about five (5) inches. It has been determined that the illustrated length of extension over the draper belt 250 and the height of the upper edge 296 relative to the draper belt 250 permits the center crop deflector 284 to direct the severed crop material while providing minimal restriction to material flow in the aft direction. In addition, the lower edge 298 is preferably spaced above the draper belt 250 a distance less than about 1.5 inches so that the center crop deflector 284 is restricted from contacting the draper belt 250 while sufficiently restricting crop material from flowing from one side draper 52 to the other. Those of ordinary skill in the art will appreciate that such untoward crop flow is particularly problematic when cutting with only one side of the header 40. For instance, when cutting crop only on the left side of the header 40, the left side draper 52 will convey crop material toward the center draper 54. Because the right side draper 52 is conveying little or no crop material toward the center draper 54, the crop material from the left side meets little resistance when reaching the center draper 54 and can continue to flow past the center draper 54 and into the right side draper 52. Therefore, the center crop deflector 284 serves to provide sufficient resistance so that material deposited from one side draper 52 is restricted from flowing entirely across the center draper 54 to the other side draper 52.

Operation

In operation, the illustrated harvesting header is operable to be advanced by the harvesting machine in a field to cut the crop and collect the severed crop material for disposal into a feeder house of the harvesting machine. As the header is advanced in the forward direction, the crop divider 146 of the end tilt arm assembly 46 defines a crop cutting path of the header and pushes crop along the sides of the path in an inboard direction. At the same time, the cutterbar assembly 48 operates to sever the crop and the reel (not shown) pushes the severed crop material onto the drapers 52,54. Severed crop material located on the side drapers 52 is carried inwardly toward and deposited onto the center draper 54. In particular, both left and right side drapers 52 are operable to carry any crop material inwardly, with the center crop deflector 284 being operable to restrict crop flow from one of the side drapers 52 to pass over to the other side draper 52. Crop material on the center draper 54 is carried in a rearward direction toward the collecting auger 55 and is then deposited through the opening 66 and into the feeder house.

The harvesting header is operable to cut and collect crop material in either the flexible header configuration or the non-flexible header configuration by configuring the arm assemblies 44,46 in corresponding arm pivoting and rigid arm configurations. The arms are placed in the rigid arm configuration by positioning the corresponding quick-release pin 98 into the locked location. With all of the arm assemblies 44,46 in the rigid configuration, the header is placed into the non-flexible header configuration. In the non-flexible configuration, the header can be advanced through the field so that the cutterbar assembly 48 and drapers 52,54 substantially do not flex relative to the header frame 42. Furthermore, any contact between the ground and the cutterbar assembly 48 will cause substantially no flexing movement of the cutterbar assembly 48 or the drapers 52,54.

Similarly, the arm assemblies 44,46 can be placed in the arm pivoting configurations by positioning the quick-release pin 98 into the unlocked location. The flexible header configuration is achieved by configuring all of the arm assemblies 44,46 in the arm pivoting configuration. In the flexible header configuration, the header can be advanced through the field so that the cutterbar assembly 48 and drapers 52,54 are operable to flex relative to the header frame 42 between lowermost and uppermost positions. Any contact between the ground and the cutterbar assembly 48 will cause the cutterbar assembly 48 and at least one of the drapers 52,54 to flex upwardly relative to the header frame 42, provided that the adjacent arm assemblies 44,46 have not already reached the uppermost position. When the arm assemblies 44,46 pivot upwardly beyond a predetermined arm movement threshold between the lowermost and uppermost positions, a controller of the harvesting machine senses the threshold condition and raises the header in response to the condition until the arm assemblies 44,46 pivot downwardly below the threshold. The flexible header configuration is particularly suited for cutting crop close to the ground where some intermittent contact occurs between the header and the ground.

Alternative Embodiment

Turning to FIG. 31, an alternative preferred header 400 is constructed in accordance with a second embodiment of the present invention. For the sake of brevity, the description will focus primarily on the differences of this alternative embodiment from the preferred embodiment described above. The header 400 includes a header frame 402 and an end tilt arm 404 pivotally mounted to the header frame 402. The header 400 further includes fixed and adjustable pins 406,408 that are attached to an upright 410 of the header frame 402. The upright 410 presents an opening 412 that includes three discrete pin-receiving sections that define locked locations 414 and unlocked locations 416,418, each of which is operable to receive the adjustable pin 408 so that the pin can be selectively positioned in one of the locations. The unlocked locations 416,418 provide two distinct lowermost arm positions that correspond with distinct ranges of angular arm movement. Thus, the unlocked location 418 permits a full range of angular arm movement of the end tilt arm 404, while unlocked location 416 permits a range of movement that is about half of the full range of angular arm movement provided by location 418. The locked location 414 serves to provide an uppermost arm position that corresponds with a locked arm position, with substantially no range of angular arm movement being permitted. Preferably, each of the support arms of the illustrated header 400 has a similar stop arrangement that provides similar locked and unlocked locations.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A harvesting header operable to harvest crop, said harvesting header comprising:
  a header frame;
  a flexible cutterbar assembly mounted to the header frame to extend lengthwise in a lateral direction relative to the normal direction of travel of the header;
  a plurality of laterally spaced apart support arms being attached to and cooperatively supporting the flexible cutterbar assembly,
  each of said support arms being pivotally coupled to the frame for swinging movement about a laterally extending axis so that the flexible cutterbar assembly is operable to flex along the length thereof in response to changes in terrain as the header is advanced;
  a draper assembly supported on the header frame behind the cutterbar assembly to flex therewith,
  said draper assembly including a pair of side drapers configured to receive severed crop materials from the cutterbar assembly and convey the materials laterally,
  said side drapers presenting opposite laterally outermost margins of the draper assembly, with an outermost one of the support arms being located adjacent each of the end margins;
  a pair of end crop dividers, each being mounted adjacent a respective one of the outermost support arms,
  said side drapers each including a flexible endless draper belt presenting laterally endmost margins, one of which defines the corresponding outermost margin of the draper assembly,
  said outermost support arms being positioned laterally outside of the endmost margins of the draper belts,
  said cutterbar assembly including a split sickle assembly to present a pair of side sickle portions; and
  a pair of cutterbar drives supported on the outermost support each being operable to provide driving power to a respective one of the side sickle portions,
  each of said crop dividers being in a covering relationship with the respective cutterbar drive,
  each of said cutterbar drives including a drive shaft and a forward gearbox drivingly connected between the drive shaft and the respective side sickle portion,
  said forward gearbox being supported on the respective outermost support arm adjacent the cutterbar assembly so that the forward gearbox shifts with the flexible cutterbar assembly.

2. The harvesting header as claimed in claim 1,
  said draper assembly including a fore-and-aft draper located between the side drapers, said side drapers operable to convey the severed crop materials from the cutterbar assembly laterally to the fore-and-aft draper.

3. The harvesting header as claimed in claim 1,
  said one endmost margin of each draper belt being supported on a roller carried by one of the support arms,
  said one support arm being adjacent and spaced laterally inward from the respective outermost support arm.

4. The harvesting header as claimed in claim 3,
  said roller being shiftable in a lateral direction to provide adjustable tensioning of the respective draper belt.

5. The harvesting header as claimed in claim 4,
  each of said draper belts presenting an upper crop-conveying run,
  each of said crop dividers including a lower edge adjacent the respective draper belt that is spaced above the upper crop-conveying run, such that the endmost margin of the respective draper belt is at least partly positionable under the lower edge.

6. The harvesting header as claimed in claim 3,
  said cutterbar assembly including a plurality of skid plates configured to engage the ground and thereby cause flexing of the cutterbar assembly,
  said one support arm and the outermost support arm each having a separate skid plate attached thereto so that the arms are independently swingable about the axis.

7. The harvesting header as claimed in claim 3,
  said cutterbar assembly including a flexible cutterbar and a sickle assembly supported on the cutterbar,
  said cutterbar interconnecting the one support arm and the outermost support arm.

8. The harvesting header as claimed in claim 1; and
  at least one cutterbar drive being mounted to a respective one of the outermost support arms and operable to provide driving power to the cutter bar assembly.

9. The harvesting header as claimed in claim 8,
  said crop divider associated with the respective one of the outermost support arms being in a covering relationship with the at least one cutterbar drive.

10. The harvesting header as claimed in claim 1,
  each of said crop dividers including an integral crop deflector that angles downwardly toward the adjacent outermost margin of the draper assembly.

11. The harvesting header as claimed in claim 10, said side drapers each including a flexible endless draper belt presenting laterally endmost margins, one of which defines the corresponding outermost margin of the draper assembly, said outermost support arms being positioned laterally outside of the endmost margins of the draper belts, said one endmost margin of each draper belt being supported on a roller carried by one of the support arms, said one support arm being adjacent and spaced laterally inward from the respective outermost support arm, said roller being shiftable in a lateral direction to provide adjustable tensioning of the respective draper belt.

12. The harvesting header as claimed in claim 11, each of said draper belts presenting an upper crop-conveying run, each of said crop deflectors including a lower edge adjacent the respective draper belt that is spaced above the upper crop-conveying run, such the endmost margin of the respective draper belt is at least partly positionable under the lower edge.

13. The harvesting header as claimed in claim 1, each of said crop dividers including a hollow body presenting a forward tip and rearwardly expanding wall structure projecting from the tip, said body being in a generally covering relationship with at least the forward portion of the respective outermost support arm.

14. The harvesting header as claimed in claim 13, each of said crop dividers including a support bar fixed to the wall structure of the body and being slidably coupled to the header frame.

\* \* \* \* \*